(12) United States Patent
Shimanouchi et al.

(10) Patent No.: US 7,986,507 B2
(45) Date of Patent: Jul. 26, 2011

(54) VARIABLE CAPACITOR

(75) Inventors: Takeaki Shimanouchi, Kawasaki (JP); Masahiko Imai, Kawasaki (JP); Yu Yonezawa, Yokohama (JP); Xiaoyu Mi, Kawasaki (JP); Satoshi Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 656 days.

(21) Appl. No.: 12/010,367

(22) Filed: Jan. 24, 2008

(65) Prior Publication Data

US 2008/0180876 A1 Jul. 31, 2008

(30) Foreign Application Priority Data

Jan. 26, 2007 (JP) ................. 2007-015826

(51) Int. Cl.
*H01G 5/00* (2006.01)

(52) U.S. Cl. ........ 361/277; 361/272; 361/278; 361/281; 361/290; 361/291

(58) Field of Classification Search ................. 361/277, 361/278–279, 280–281, 283.1, 287, 290–291, 361/298.2, 298.3, 272–273
See application file for complete search history.

(56) References Cited

U.S. PATENT DOCUMENTS

| | | | | |
|---|---|---|---|---|
| 5,557,495 | A | 9/1996 | Belcher et al. | 361/298.2 |
| 5,901,031 | A * | 5/1999 | Ishige et al. | 361/277 |
| 6,229,684 | B1 * | 5/2001 | Cowen et al. | 361/278 |
| 6,242,989 | B1 * | 6/2001 | Barber et al. | 331/177 V |
| 6,373,682 | B1 * | 4/2002 | Goodwin-Johansson | 361/278 |
| 6,625,004 | B1 * | 9/2003 | Musolf et al. | 361/278 |
| 6,906,905 | B1 * | 6/2005 | Chinthakindi | 361/277 |
| 6,992,878 | B2 * | 1/2006 | Shimanouchi et al. | 361/280 |
| 7,082,024 | B2 * | 7/2006 | Casset et al. | 361/277 |
| 7,307,827 | B2 | 12/2007 | Shimanouchi et al. | 361/278 |
| 2003/0102771 | A1 | 6/2003 | Akiba et al. | |
| 2003/0179535 | A1 | 9/2003 | Shimanouchi et al. | |
| 2004/0214543 | A1 | 10/2004 | Osone et al. | 455/197.2 |
| 2007/0278075 | A1 | 12/2007 | Terano et al. | 200/181 |

FOREIGN PATENT DOCUMENTS

| | | |
|---|---|---|
| JP | 2003-136496 | 5/2003 |
| JP | 2004-6588 | 1/2004 |
| JP | 2004-127973 | 4/2004 |
| JP | 2004-327877 | 11/2004 |
| JP | 2006-210843 | 8/2006 |
| WO | WO 2006/011239 A1 | 2/2006 |

OTHER PUBLICATIONS

Office Action dated Jan. 8, 2010 corresponding to Chinese Patent Application No. 2008100089293.
European Search Report of May 28, 2008.
Office Action dated Aug. 25, 2009 issued in corresponding Korean Patent application.

* cited by examiner

*Primary Examiner* — Nguyen T Ha
(74) *Attorney, Agent, or Firm* — Fujitsu Patent Center

(57) ABSTRACT

A variable capacitor is provided which is appropriate for suppressing fluctuation in driving voltage characteristic and for achieving a larger variation ratio of static capacitance. The variable capacitor includes a fixed electrode and a movable electrode. The fixed electrode includes a first opposing face, while the movable electrode includes a second opposing face that faces the first opposing face. The movable electrode further includes a curved portion that protrudes toward the fixed electrode. The variable capacitor also includes a dielectric pattern provided on the first opposing face.

10 Claims, 32 Drawing Sheets (a)

(b)

(c)

VARIABLE CAPACITOR

BACKGROUND OF THE INVENTION

1. Field of the Invention

The present invention relates to a variable capacitor capable of changing static capacitance.

2. Description of the Related Art

In the technical field of wireless communication equipments such as a mobile phone, the increase in number of components to be incorporated in the equipment for achieving higher performance has been creating growing demand for smaller sizes of high-frequency and RF circuits. In order to satisfy such demand, a technique called micro-electromechanical systems (hereinafter, MEMS) has been employed for micronization of various components constituting the circuit, including a variable capacitor. The variable capacitor is an essential component in a variable-frequency transmitter, a tuned amplifier, an impedance matching circuit and so on. The variable capacitor that can be obtained based on the MEMS technique can be found, for example, in the patent documents 1 and 2 cited here below.

Patent document 1: JP-A-2004-6588
Patent document 2: JP-A-2004-127973

The variable capacitor manufactured through the MEMS technique generally includes a fixed electrode and a movable electrode disposed so as to oppose each other. The movable electrode is set to move closer to and away from the fixed electrode. In such variable capacitor, a voltage applied between the fixed electrode and the movable electrode is controlled so as to adjust static attraction generated therebetween, to thereby adjust the position of the movable electrode, hence the gap between the electrodes, thus varying the static capacitance.

Also, in the variable capacitor the fixed electrode may be provided with a dielectric film on its surface opposing the movable electrode, to prevent a direct contact with the movable electrode, which is set to move toward the fixed electrode, because the direct contact of the electrodes causes a short-circuit therebetween. For controlling the variable static capacitance, some variable capacitors are designed such that the movable electrode can be intentionally brought into contact with the dielectric film on the surface of the fixed electrode, while in other variable capacitors the movable electrode may accidentally contact the dielectric film on the surface of the static capacitance, during the controlling process of the static capacitance.

When the movable electrode and the dielectric film on the surface of the fixed electrode come into contact, with the voltage being applied between the both electrodes, the charge may transfer between the movable electrode and the dielectric film. To be more detailed, when the movable electrode and the dielectric film on the surface of the fixed electrode come into contact, with the voltage being applied between the fixed electrode and the movable electrode so as to grant a positive potential to the movable electrode, an electron (negative charge) may transfer from the dielectric film to the movable electrode via the interface between the movable electrode and the dielectric film, to thereby create a hole (positive potential) in the dielectric film. When the movable electrode and the dielectric film on the surface of the fixed electrode come into contact, with the voltage being applied between the fixed electrode and the movable electrode so as to grant a positive potential to the fixed electrode, an electron (negative charge) may transfer from the movable electrode to the dielectric film via the interface between the movable electrode and the dielectric film. Accordingly, repeated contacts between the movable electrode and the dielectric film on the surface of the fixed electrode often cause the dielectric film to be significantly charged, because of such charge transfer.

Although the voltage applied between the movable electrode and the fixed electrode remains the same, the net magnitude of the field created between the electrodes of the variable capacitor fluctuates depending on whether and how much the dielectric film is charged, and hence a minimum driving voltage, to be applied between the electrodes so as to cause the movable electrode to move from its initial position, is not constant. Besides, the relationship between the static capacitance and the driving voltage (voltage to be applied between the electrodes to attain a predetermined static capacitance, or the gap between the electrodes) for driving the variable capacitor, or the movable electrode thereof, also fluctuates depending on whether and how much the dielectric film is charged. Thus, the driving voltage characteristic fluctuates depending on whether and how much the dielectric film is charged. Although the movable electrode is provided with the dielectric film on its surface, instead of or in addition to the dielectric film on the surface of the fixed electrode, the driving voltage characteristic may likewise fluctuate depending on whether and how much the dielectric film is charged. In the variable capacitor of the conventional design to adjust the static capacitance by controlling the gap between the electrodes, the amplitude of the fluctuation in driving voltage characteristic is significant. In addition, a larger variation ratio is generally required, with respect to the static capacitance of the variable capacitor.

SUMMARY OF THE INVENTION

The present invention has been proposed under the foregoing situation, with an object to provide a variable capacitor capable of suppressing fluctuation in driving voltage characteristic, and achieving a larger variation ratio of static capacitance.

A first aspect of the present invention provides a variable capacitor comprising a capacitor electrode having a first opposing face, a movable capacitor electrode film having a second opposing face opposing the first opposing face and a curved portion protruding toward the capacitor electrode or in an opposite direction of the capacitor electrode, and a dielectric pattern provided on one of the first opposing face and the second opposing face. The dielectric pattern is formed in a pattern on the first or the second opposing face, and includes, for example, a plurality of dielectric islands spaced from each other on the first or the second opposing face. A length per unit area of the dielectric pattern based on the overall length of the outline of the dielectric pattern on the first or the second opposing face is longer than a length per unit area of, for example, a rectangular dielectric film assumed to be provided on an entirety of the first or the second opposing face, based on the overall length of the outline of such dielectric film. In other words, the total length of the outline of the dielectric pattern on the first or the second opposing face is relatively long. Such dielectric pattern serves to prevent a short-circuit between the capacitor electrode and the movable capacitor electrode film in the variable capacitor, and is hence formed in such a pattern shape that allows performing the short-circuit prevention (for example, a pattern shape that restricts excessive exposure of the first or the second opposing face, whichever is provided with the dielectric pattern).

Since the movable capacitor electrode film of this variable capacitor is curved as stated above, the spacing between the first opposing face of the capacitor electrode and the second opposing face of the movable capacitor electrode film is not uniform over the entire region between the opposing faces, when the both electrodes are in their initial positions (first state), without a voltage being applied therebetween. In such initial state, the gap between the capacitor electrode or the first opposing face and the movable capacitor electrode film or the second opposing face has a maximal volume.

Applying a voltage of a predetermined value or greater between the electrodes in this variable capacitor can bring the first opposing face of the capacitor electrode and the second opposing face of the movable capacitor electrode film to a closest position (second state) via the dielectric pattern on the first or the second opposing face, with static attraction generated between the electrodes. At this moment, the dielectric pattern prevents the capacitor electrode and the movable capacitor electrode film from directly contacting each other. Under such state, the gap between the capacitor electrode or the first opposing face and the movable capacitor electrode film or the second opposing face has a minimal volume.

With the gradual increase of the voltage applied between the electrodes of the variable capacitor that causes the transition of the variable capacitor from the first state to the second state, the movable capacitor electrode film of the curved shape is attracted toward the capacitor electrode, until the capacitor electrode and the movable capacitor electrode film come into partial contact via the dielectric pattern (in other words, a portion of the capacitor electrode and a portion of the movable capacitor electrode film become closest via the dielectric pattern), such that the spacing between the electrodes become minimal sequentially from the vicinity of the partial contact portion of the capacitor electrode and the movable capacitor electrode film, until finally the spacing between the electrodes becomes minimal over the entire region between the first opposing face of the capacitor electrode and the second opposing face of the movable capacitor electrode film. The foregoing variable capacitor can thus continuously change, over an extensive range, the volume of the gap between the electrodes, between the first state where the gap is largest and the second state where the gap is smallest, by controlling the driving voltage applied between the electrodes. The variable capacitor according to the present invention allows, therefore, achieving a large variation range, or variation ratio, of the static capacitance.

Further, in this variable capacitor the dielectric pattern on the first or the second opposing face is difficult to be charged. The present inventors have discovered that, when a dielectric film provided on a conductor is electrically charged by bringing a conductor material or the like into contact with the dielectric film under a predetermined condition (i.e. when the dielectric film is charged by what is known as charge transfer from outside to the dielectric film), the extent of the charge is more alleviated when a length per unit area of the dielectric film provided on the conductor, based on the overall length of the outline of the dielectric film, is longer. Whereas the electrical charges (electrons, or holes) concentrate in the vicinity of an exposed surface of the dielectric film when the dielectric film is charged by the so-called charge transfer, it can be presumed that a greater amount of charge immigrates from the vicinity of the exposed surface of the dielectric film to the surface of the conductor disposed in contact therewith, when the length per unit area of the dielectric film based on the overall length of the outline of the dielectric film is longer. Presumably, this is one of the reasons of the alleviation of the charging extent.

In this variable capacitor, the total length of the outline of the dielectric pattern formed in a predetermined pattern on the first or the second opposing face is relatively long, as already stated (in other words, the length per unit area of the dielectric pattern based on the overall length of the outline of the dielectric pattern is relatively long), and hence the charge can readily immigrate from the dielectric pattern to the first or the second opposing face. Accordingly, the dielectric pattern in this variable capacitor is prevented from being charged by the so-called charge transfer. In this variable capacitor, therefore, the minimum driving voltage, to be applied between the movable capacitor electrode film and the capacitor electrode so as to cause the movable capacitor electrode film to move from its initial position, can be prevented from fluctuating, and also the relationship between the static capacitance and the driving voltage (voltage to be applied between the electrodes to attain the predetermined static capacitance, or volume of the gap between the electrodes) for driving the variable capacitor, or the movable capacitor electrode film thereof, can be prevented from fluctuating. The foregoing variable capacitor can thus suppress the fluctuation of the driving voltage characteristic.

Thus, the variable capacitor according to the first aspect of the present invention is appropriate for suppressing the fluctuation in driving voltage characteristic, and achieving a larger variation ratio of the static capacitance.

A second aspect of the present invention provides a variable capacitor comprising a capacitor electrode having a first opposing face, a movable capacitor electrode film having a second opposing face opposing the first opposing face, an anchor portion that partially fixes the movable capacitor electrode film to the capacitor electrode, and a dielectric pattern provided on one of the first opposing face and the second opposing face. The dielectric pattern serves, as the dielectric pattern of the variable capacitor according to the first aspect, to prevent a short-circuit between the capacitor electrode and the movable capacitor electrode film, and hence is formed in such a pattern shape that allows performing the short-circuit prevention, and the total length of its outline is relatively long.

In this variable capacitor, when the both electrodes are in their initial positions (first state), without a voltage being applied therebetween, the gap between the capacitor electrode or the first opposing face and the movable capacitor electrode film or the second opposing face has a maximal volume.

Applying a voltage of a predetermined value or greater between the electrodes in this variable capacitor can bring a portion of the first opposing face (for example, a majority thereof) of the capacitor electrode and a portion of the second opposing face (for example, a majority thereof) of the movable capacitor electrode film to a closest position (second state) via the dielectric pattern on the first or the second opposing face, with static attraction generated between the electrodes, except for the portion of the capacitor electrode or the first opposing face and of the movable capacitor electrode film or the second mutually fixed by the anchor portion. At this moment, the dielectric pattern prevents the capacitor electrode and the movable capacitor electrode film from directly contacting each other. Under such state, the gap between the capacitor electrode or the first opposing face and the movable capacitor electrode film or the second opposing face has a minimal volume.

With the gradual increase of the voltage applied between the electrodes of the variable capacitor that causes the transition of the variable capacitor from the first state to the second state, the movable capacitor electrode film is attracted toward the capacitor electrode (the amount or distance by which the movable capacitor electrode film is attracted to the capacitor electrode is not uniform over the entirety of the movable capacitor electrode film), except for the portion fixed to the capacitor electrode by the anchor portion (fixed portion), until the capacitor electrode and the movable capacitor electrode film come into partial contact via the dielectric pattern, such that the spacing between the electrodes become minimal sequentially from the vicinity of the partial contact portion of the capacitor electrode and the movable capacitor electrode film, until finally the spacing between the electrodes become minimal over the entire portion of the first opposing face (for example, the majority thereof) of the capacitor electrode and the portion of the second opposing face (for example, the majority thereof) of the movable capacitor electrode film. The foregoing variable capacitor can thus continuously increase the volume of the gap between the electrodes, over an extensive range, between the first state where the gap is largest and the second state where the gap is smallest. The variable capacitor according to the present invention allows, therefore, achieving a large variation range, or variation ratio, of the static capacitance.

Further, in this variable capacitor, the total length of the outline of the dielectric pattern formed in a predetermined pattern on the first or the second opposing face is relatively long, as already stated (in other words, the length per unit area of the dielectric pattern based on the overall length of the outline of the dielectric pattern is relatively long), and hence the charge can readily immigrate from the dielectric pattern to the first or the second opposing face. Accordingly, this variable capacitor can suppress the fluctuation of the driving voltage characteristic, for the same reason as described regarding the variable capacitor according to the first aspect.

Thus, the variable capacitor according to the second aspect of the present invention is appropriate for suppressing the fluctuation in driving voltage characteristic, and achieving a larger variation ratio of the static capacitance.

Moreover, in this variable capacitor the capacitor electrode and the movable capacitor electrode film are partially linked or connected by the anchor portion. Such structure allows suppressing accidental deformation or deflection of the electrodes (the movable capacitor electrode film, in particular) due to temperature fluctuation, regardless of whether being driven or undriven, thereby suppressing fluctuation in gap volume between the electrodes due to the temperature fluctuation. The variable capacitor according to the second aspect is, therefore, appropriate for suppressing fluctuation in static capacitance due to temperature fluctuation. Such technical merit is also offered by the variable capacitor according to the fourth, the sixth, and the eighth aspects of the present invention.

In the variable capacitor according to the first and the second aspect the present invention, a C-V (static capacitance-driving voltage) characteristic may be adjusted by controlling at least one of the shape and the density of the dielectric pattern. Whereas the dielectric pattern includes, for example, the plurality of dielectric islands as already stated, forming a portion where the pattern density is not uniform in the dielectric pattern enables adjusting, for example, the C-V characteristic.

Preferably, the variable capacitor according to the first and the second aspect of the present invention includes a conductor layer provided on the dielectric pattern. Alternatively, the variable capacitor according to the first and the second aspect may include another dielectric pattern provided on one of the first opposing face and the second opposing face on which the dielectric pattern is not provided. It is preferable that the dielectric pattern includes a plurality of dielectric islands. The so-called charge transfer is less likely to take place between conductors and between dielectrics, than between a conductor and a dielectric.

A third aspect of the present invention provides a variable capacitor comprising a capacitor electrode having a first opposing face, a movable capacitor electrode film having a second opposing face opposing the first opposing face and a curved portion protruding toward the capacitor electrode or in an opposite direction of the capacitor electrode, a dielectric film provided on one of the first opposing face and the second opposing face, and a conductor pattern provided on the other of the first opposing face and the second opposing face. The dielectric film in this variable capacitor serves to prevent a short-circuit between the capacitor electrode and the movable capacitor electrode film. The conductor pattern is formed in a pattern on the first or the second opposing face, and includes, for example, a plurality of conductor islands spaced from each other on the first or the second opposing face. The surface of the conductor pattern opposing the dielectric film is smaller in area than the first or the second opposing face.

This variable capacitor may be driven in a similar manner to the variable capacitor according to the first aspect, and is therefore capable of achieving a large variation amount, or variation ratio, of the static capacitance, like the variable capacitor according to the first aspect.

In this variable capacitor, the conductor pattern on the first or the second opposing face comes into direct contact with the dielectric film on the second or the first opposing face, under the state where the spacing between the electrodes becomes minimal over the entire region between the first opposing face of the capacitor electrode and the second opposing face of the movable capacitor electrode film (the second state). The structure that the surface of the conductor pattern opposing the dielectric film is smaller in area than the first or the second opposing face contributes to suppressing the charge transfer originating from the contact between the conductor material and the dielectric film, for example under such second state. In this variable capacitor, therefore, the dielectric film can be prevented from being charged by the so-called charge transfer, and the driving voltage characteristic can be prevented from fluctuating.

Thus, the variable capacitor according to the third aspect of the present invention is appropriate for suppressing the fluctuation in driving voltage characteristic, and achieving a larger variation ratio of the static capacitance.

A fourth aspect of the present invention provides a variable capacitor comprising a capacitor electrode having a first opposing face, a movable capacitor electrode film having a second opposing face opposing the first opposing face, a dielectric film provided on one of the first opposing face and the second opposing face, an anchor portion that partially fixes the movable capacitor electrode film to the capacitor electrode, and a conductor pattern provided on the other of the first opposing face and the second opposing face. The dielectric film serves to prevent a short-circuit between the capacitor electrode and the movable capacitor electrode film, in this variable capacitor. The conductor pattern is formed in a pattern on the first or the second opposing face. The surface of the conductor pattern opposing the dielectric film is smaller in area than the first or the second opposing face.

This variable capacitor may be driven in a similar manner to the variable capacitor according to the second aspect, and is therefore capable of achieving a large variation amount, or variation ratio, of the static capacitance, like the variable capacitor according to the second aspect.

In this variable capacitor, the conductor pattern on the first or the second opposing face comes into direct contact with the dielectric film on the second or the first opposing face, under the state where a portion of the first opposing face (for example, a majority thereof) of the capacitor electrode and a portion of the second opposing face (for example, a majority thereof) of the movable capacitor electrode film are closest to each other via the dielectric film and the conductor pattern (second state). Accordingly, this variable capacitor can suppress the fluctuation of the driving voltage characteristic, for the same reason as described regarding the variable capacitor according to the third aspect.

Thus, the variable capacitor according to the fourth aspect of the present invention is appropriate for suppressing the fluctuation in driving voltage characteristic, and achieving a larger variation ratio of the static capacitance.

A fifth aspect of the present invention provides a variable capacitor comprising a capacitor electrode having a first opposing face, a movable capacitor electrode film having a second opposing face opposing the first opposing face and a curved portion protruding toward the capacitor electrode or in an opposite direction of the capacitor electrode, a dielectric film provided on one of the first opposing face and the second opposing face, and a conductor pattern provided on the dielectric film. The dielectric film in this variable capacitor serves to prevent a short-circuit between the capacitor electrode and the movable capacitor electrode film. The conductor pattern is formed in a pattern on the dielectric film, and includes, for example, a plurality of conductor islands spaced from each other on the dielectric film. The conductor pattern occupies a smaller area on the dielectric film located thereunder.

This variable capacitor may be driven in a similar manner to the variable capacitor according to the first aspect, and is therefore capable of achieving a large variation amount, or variation ratio, of the static capacitance, like the variable capacitor according to the first aspect.

In this variable capacitor, the conductor pattern on the dielectric film comes into direct contact with the capacitor electrode (the first opposing face) or the movable capacitor electrode film (the second opposing face), under the state where the spacing between the electrodes becomes minimal over the entire region between the first opposing face of the capacitor electrode and the second opposing face of the movable capacitor electrode film (the second state). In the case where conductors make mutual contact, the so-called charge transfer is less likely to take place. Further, the structure that the conductor pattern is smaller in area than the dielectric film contributes to suppressing the charge transfer originating from the contact between the conductor pattern and the capacitor electrode or the movable capacitor electrode film, for example under such second state. Accordingly, in this variable capacitor the amount of the charge transfer from the conductor pattern to the dielectric film can be restricted. In this variable capacitor, therefore, the dielectric film can be prevented from being charged, and the driving voltage characteristic can be prevented from fluctuating.

Thus, the variable capacitor according to the fifth aspect of the present invention is appropriate for suppressing the fluctuation in driving voltage characteristic, and achieving a larger variation ratio of the static capacitance.

A sixth aspect of the present invention provides a variable capacitor comprising a capacitor electrode having a first opposing face, a movable capacitor electrode film having a second opposing face opposing the first opposing face, an anchor portion that partially fixes the movable capacitor electrode film to the capacitor electrode, a dielectric film provided on one of the first opposing face and the second opposing face, and a conductor pattern provided on the dielectric film. The dielectric film in this variable capacitor serves to prevent a short-circuit between the capacitor electrode and the movable capacitor electrode film. The conductor pattern is formed in a pattern on the dielectric film. The conductor pattern occupies a smaller area on the dielectric film located thereunder.

This variable capacitor may be driven in a similar manner to the variable capacitor according to the second aspect, and is therefore capable of achieving a large variation amount, or variation ratio, of the static capacitance, like the variable capacitor according to the second aspect.

In this variable capacitor, the conductor pattern which is smaller in area than the dielectric film located thereunder comes into direct contact with the capacitor electrode (the first opposing face) or the movable capacitor electrode film (the second opposing face), under the state where a portion of the first opposing face (for example, a majority thereof) of the capacitor electrode and a portion of the second opposing face is (for example, a majority thereof) of the movable capacitor electrode film are closest to each other via the dielectric film on the first or the second opposing face and the conductor pattern (second state). Accordingly, this variable capacitor can suppress the fluctuation of the driving voltage characteristic, for the same reason as described regarding the variable capacitor according to the fifth aspect.

Thus, the variable capacitor according to the sixth aspect of the present invention is appropriate for suppressing the fluctuation in driving voltage characteristic, and achieving a larger variation ratio of the static capacitance.

A seventh aspect of the present invention provides a variable capacitor comprising a capacitor electrode having a first opposing face, a movable capacitor electrode film having a second opposing face opposing the first opposing face and a curved portion protruding toward the capacitor electrode or in an opposite direction of the capacitor electrode, a dielectric film provided on one of the first opposing face and the second opposing face, and a conductor pattern buried in the dielectric film so as to be exposed toward the movable capacitor electrode film. The dielectric film in this variable capacitor serves to prevent a short-circuit between the capacitor electrode and the movable capacitor electrode film. The conductor pattern is formed in a predetermined pattern, and includes, for example, a plurality of openings through which the dielectric film is partially exposed toward the opposing electrode.

This variable capacitor may be driven in a similar manner to the variable capacitor according to the first aspect, and is therefore capable of achieving a large variation amount, or variation ratio, of the static capacitance, like the variable capacitor according to the first aspect. In this variable capacitor, although the electrical charge originating from the so-called charge transfer concentrates at the exposed surface of the dielectric film, the charge can readily immigrate to the conductor pattern buried in the dielectric film. In this variable capacitor, therefore, the dielectric film can be prevented from being charged, and the driving voltage characteristic can be prevented from fluctuating. Thus, the variable capacitor according to the seventh aspect of the present invention is appropriate for suppressing the fluctuation in driving voltage characteristic, and achieving a larger variation ratio of the static capacitance.

An eighth aspect of the present invention provides a variable capacitor comprising a capacitor electrode having a first opposing face, a movable capacitor electrode film having a second opposing face opposing the first opposing face, an anchor portion that partially fixes the movable capacitor electrode film to the capacitor electrode, a dielectric film provided on one of the first opposing face and the second opposing face, and a conductor pattern buried in the dielectric film so as to be exposed toward the movable capacitor electrode film. The dielectric film in this variable capacitor serves to prevent a short-circuit between the capacitor electrode and the movable capacitor electrode film. The conductor pattern is formed in a pattern on the dielectric film, and includes, for example, a plurality of openings through which the dielectric film is partially exposed toward the opposing electrode.

This variable capacitor may be driven in a similar manner to the variable capacitor according to the second aspect, and is therefore capable of achieving a large variation amount, or variation ratio, of the static capacitance, like the variable capacitor according to the second aspect. In this variable capacitor, although the electrical charge originating from the so-called charge transfer concentrates at the exposed surface of the dielectric film, the charge can readily immigrate to the conductor pattern buried in the dielectric film. In this variable capacitor, therefore, the dielectric film can be prevented from being charged, and the driving voltage characteristic can be prevented from fluctuating. Thus, the variable capacitor according to the eighth aspect of the present invention is appropriate for suppressing the fluctuation in driving voltage characteristic, and achieving a larger variation ratio of the static capacitance.

Preferably, in the variable capacitor according to the seventh and the eighth aspect of the present invention, the conductor pattern is a conductor film having a plurality of openings. In this case, it is preferable that the surface of the dielectric film opposing the movable capacitor electrode film and the surface of the conductor pattern opposing the movable capacitor electrode film are flush with each other. Alternatively, the surface of the conductor pattern opposing the movable capacitor electrode film may be recessed toward the capacitor electrode, with respect to the surface of the dielectric film opposing the movable capacitor electrode film. Otherwise, the surface of the dielectric film opposing the movable capacitor electrode film may be recessed toward the capacitor electrode, with respect to the surface of the conductor pattern opposing the movable capacitor electrode film.

Preferably, the variable capacitor according to the first, the third, the fifth, and the seventh aspect of the present invention includes an anchor portion that partially connects the capacitor electrode and the movable capacitor electrode film. Such structure is appropriate for suppressing fluctuation in static capacitance originating from temperature fluctuation.

In preferred embodiments of the variable capacitor according to the first to the eighth aspects of the present invention, the capacitor electrode is a fixed electrode. In this case, it is preferable that the first opposing face of the fixed electrode includes a curved portion protruding toward the movable capacitor electrode film, or in an opposite direction of the capacitor electrode.

In other preferred embodiments of the variable capacitor according to the first to the eighth aspects of the present invention, the capacitor electrode is a second movable capacitor electrode film. In this case, it is preferable that the second movable capacitor electrode film includes a curved portion protruding toward the other movable capacitor electrode film, or in an opposite direction of the other movable capacitor electrode film.

A ninth aspect of the present invention provides a variable capacitor comprising a movable capacitor electrode film having a first opposing face, a fixed capacitor electrode having a second opposing face opposing the first opposing face and a curved portion protruding toward the movable capacitor electrode film or in an opposite direction of the movable capacitor electrode film, and a dielectric pattern provided on one of the first opposing face and the second opposing face. The dielectric pattern serves, as the dielectric pattern of the variable capacitor according to the first aspect, to prevent a short-circuit between the electrodes, and hence is formed in such a pattern shape that allows performing the short-circuit prevention, and the total length of its outline is relatively long.

This variable capacitor may be driven in a substantially similar manner to the variable capacitor according to the first aspect, and is therefore capable of achieving a large variation amount, or variation ratio, of the static capacitance, like the variable capacitor according to the first aspect.

In this variable capacitor, the total length of the outline of the dielectric pattern formed in a predetermined pattern on the first or the second opposing face is relatively long, as already stated (in other words, the length per unit area of the dielectric pattern based on the overall length of the outline of the dielectric pattern is relatively long), and hence the charge can readily immigrate from the dielectric pattern to the first or the second opposing face, and the dielectric pattern can be prevented from being charged by the so-called charge transfer. Accordingly, this variable capacitor can suppress the fluctuation of the driving voltage characteristic, for the same reason as described regarding the variable capacitor according to the fifth aspect.

Thus, the variable capacitor according to the ninth aspect of the present invention is appropriate for suppressing the fluctuation in driving voltage characteristic, and achieving a larger variation ratio of the static capacitance.

A tenth aspect of the present invention provides a variable capacitor comprising a movable capacitor electrode film having a first opposing face, a fixed capacitor electrode having a second opposing face opposing the first opposing face and a curved portion protruding toward the movable capacitor electrode film or in an opposite direction of the movable capacitor electrode film, a dielectric film provided on one of the first opposing face and the second opposing face, and a conductor pattern provided on the other of the first opposing face and the second opposing face. The dielectric film in this variable capacitor serves to prevent a short-circuit between the movable capacitor electrode film and the fixed capacitor electrode. The conductor pattern is formed in a pattern on the first or the second opposing face. The surface of the conductor pattern opposing the dielectric film is smaller in area than the first or the second opposing face.

This variable capacitor may be driven in a substantially similar manner to the variable capacitor according to the first aspect, and is therefore capable of achieving a large variation amount, or variation ratio, of the static capacitance, like the variable capacitor according to the first aspect.

In this variable capacitor, the conductor pattern on the first or the second opposing face comes into direct contact with the dielectric film on the second or the first opposing face, under the state where the spacing between the electrodes becomes minimal over the entire region between the first opposing face of the movable capacitor electrode film and the second opposing face of the fixed capacitor electrode (the second state). The structure that the surface of the conductor pattern opposing the dielectric film is smaller in area than the first or the second opposing face contributes to suppressing the charge transfer originating from the contact between the conductor material and the dielectric film, for example under such second state. In this variable capacitor, therefore, the dielectric film can be prevented from being charged by the so-called charge transfer and the driving voltage characteristic can be prevented from fluctuating, for substantially the same reason as described regarding the variable capacitor according to the third aspect.

Thus, the variable capacitor according to the tenth aspect of the present invention is appropriate for suppressing the fluctuation in driving voltage characteristic, and achieving a larger variation ratio of the static capacitance.

An eleventh aspect of the present invention provides a variable capacitor comprising a movable capacitor electrode film having a first opposing face, a fixed capacitor electrode having a second opposing face opposing the first opposing face and a curved portion protruding toward the movable capacitor electrode film or in an opposite direction of the movable capacitor electrode film, a dielectric film provided on one of the first opposing face and the second opposing face, and a conductor pattern provided on the dielectric film. The dielectric film in this variable capacitor serves to prevent a short-circuit between the movable capacitor electrode film and the fixed capacitor electrode. The conductor pattern is formed in a pattern on the dielectric film. The conductor pattern occupies a smaller area on the dielectric film located thereunder.

This variable capacitor may be driven in a substantially similar manner to the variable capacitor according to the first aspect, and is therefore capable of achieving a large variation amount, or variation ratio, of the static capacitance, like the variable capacitor according to the first aspect.

In this variable capacitor, the conductor pattern which is smaller in area than the dielectric film located thereunder comes into direct contact with the movable capacitor electrode film (the first opposing face) or the fixed capacitor electrode (the second opposing face), under the state where the spacing between the electrodes becomes minimal over the entire region between the first opposing face of the movable capacitor electrode film and the second opposing face of the fixed capacitor electrode (the second state). In this variable capacitor, therefore, the fluctuation of the driving voltage characteristic can be prevented, for substantially the same reason as described regarding the variable capacitor according to the fifth aspect.

Thus, the variable capacitor according to the eleventh aspect of the present invention is appropriate for suppressing the fluctuation in driving voltage characteristic, and achieving a larger variation ratio of the static capacitance.

A twelfth aspect of the present invention provides a variable capacitor comprising a movable capacitor electrode film having a first opposing face, a fixed capacitor electrode having a second opposing face opposing the first opposing face and a curved portion protruding toward the movable capacitor electrode film or in an opposite direction of the movable capacitor electrode film, a dielectric film provided on one of the first opposing face and the second opposing face, and a conductor pattern buried in the dielectric film so as to be exposed toward the movable capacitor electrode film. The dielectric film in this variable capacitor serves to prevent a short-circuit between the movable capacitor electrode film and the fixed capacitor electrode. The conductor pattern is formed in a pattern on the dielectric film, and includes, for example, a plurality of openings through which the dielectric film is partially exposed toward the opposing electrode.

This variable capacitor may be driven in substantially the same manner as the variable capacitor according to the first aspect, and is therefore capable of achieving a large variation amount, or variation ratio, of the static capacitance, like the variable capacitor according to the first aspect. In this variable capacitor, although the electrical charge originating from the so-called charge transfer concentrates at the exposed surface of the dielectric film, the charge can readily immigrate to the conductor pattern buried in the dielectric film. In this variable capacitor, therefore, the dielectric film can be prevented from being charged and the driving voltage characteristic can be prevented from fluctuating, for substantially the same reason as described regarding the variable capacitor according to the seventh aspect. Thus, the variable capacitor according to the twelfth aspect of the present invention is appropriate for suppressing the fluctuation in driving voltage characteristic, and achieving a larger variation ratio of the static capacitance.

DETAILED DESCRIPTION OF THE PREFERRED EMBODIMENTS

Figure 1:
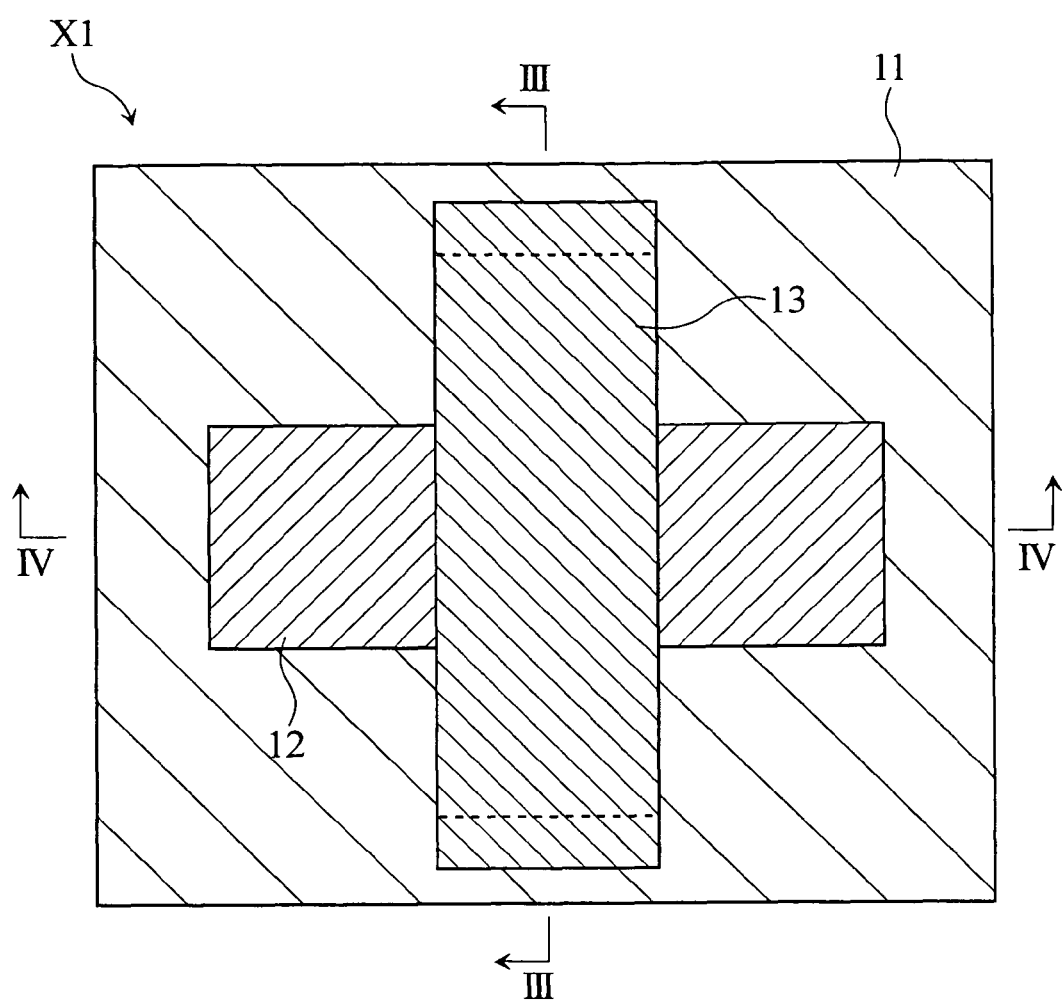
FIG. 1 is a plan view showing a variable capacitor according to a first embodiment of the present invention.
Figure 2:
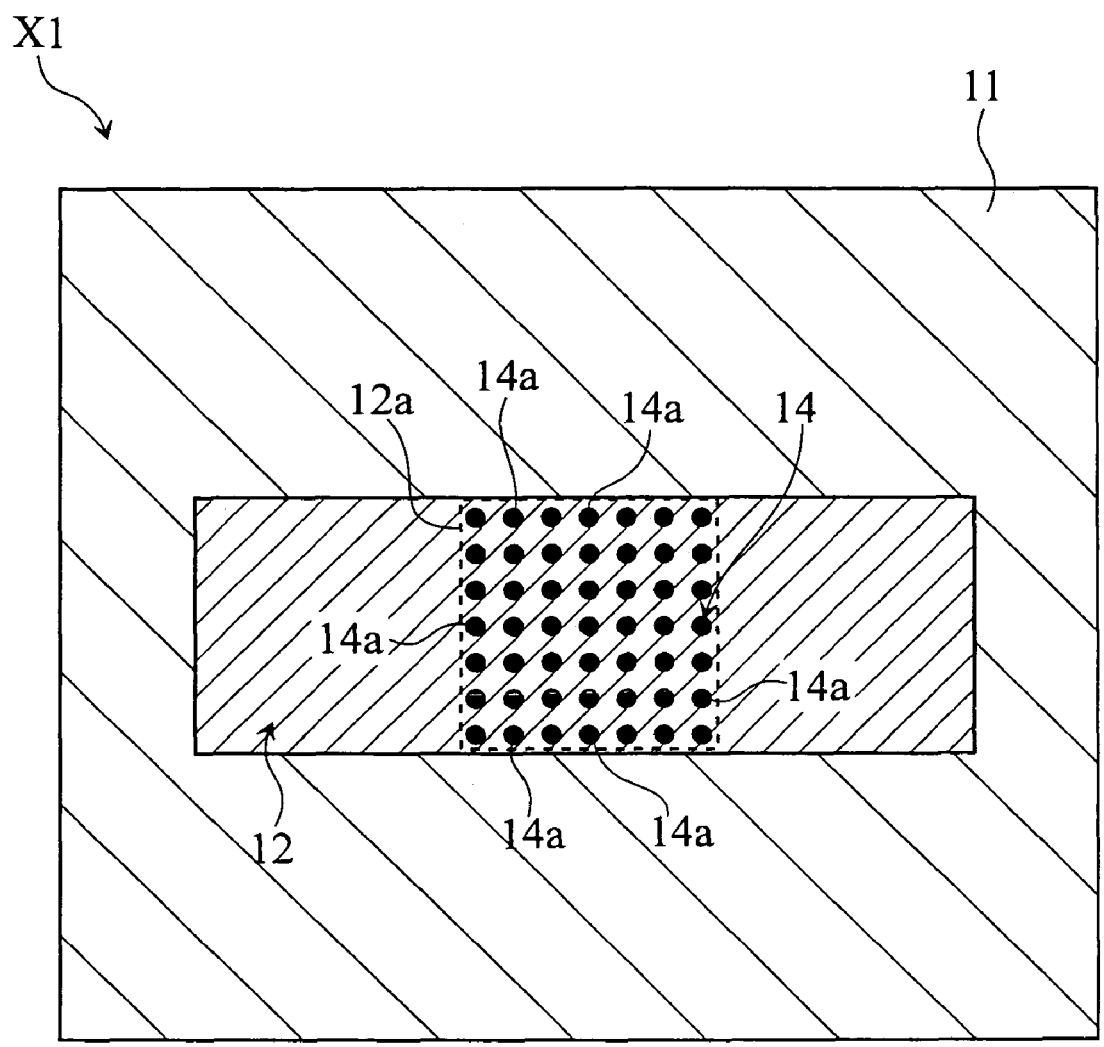
FIG. 2 is a fragmentary plan view showing the variable capacitor according to the first embodiment.
Figure 3:
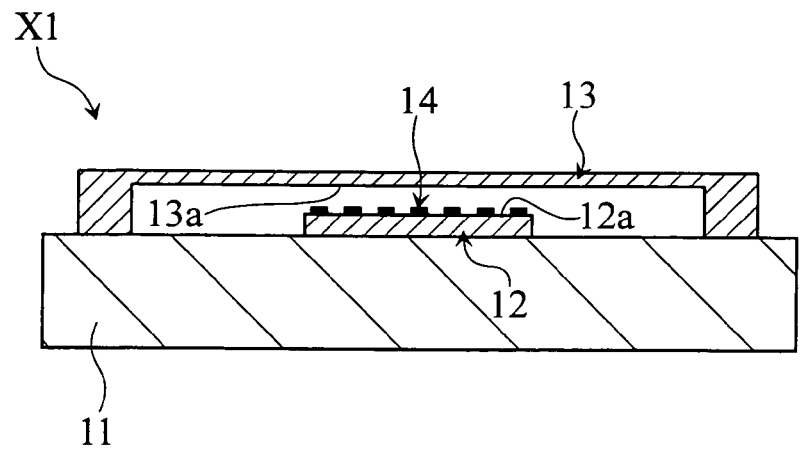
FIG. 3 is a cross-sectional view taken along the line III-III in FIG. 1.
Figure 4:
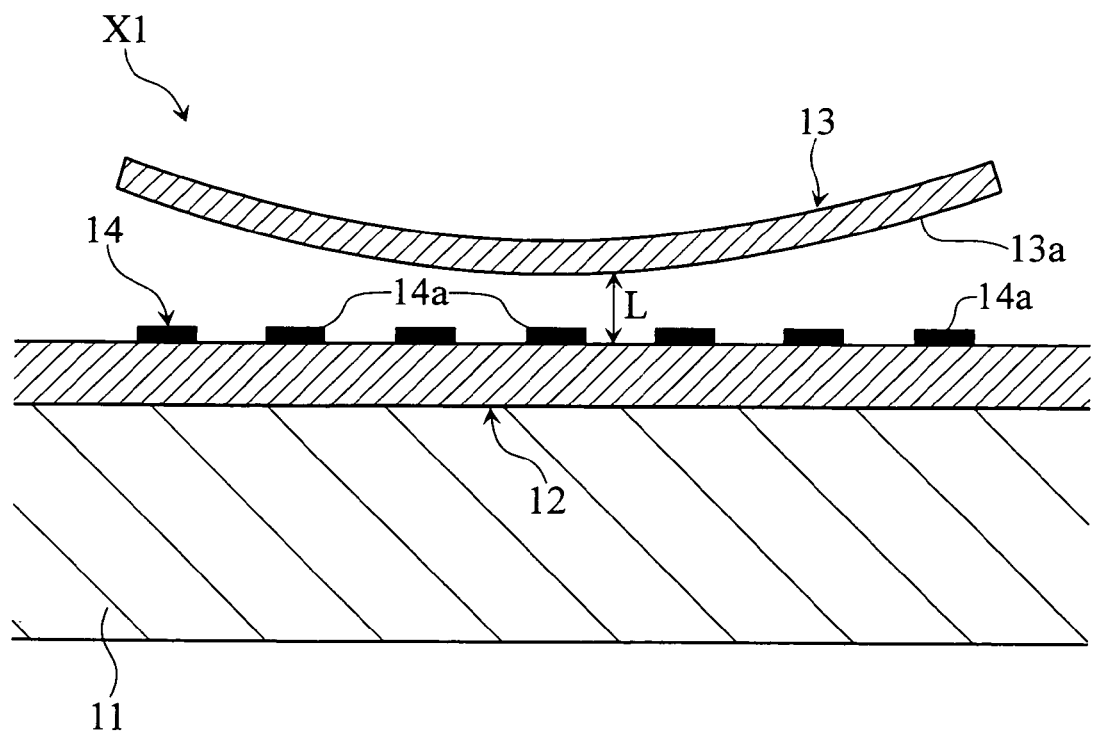
FIG. 4 is an enlarged fragmentary cross-sectional view taken along the line IV-IV in FIG. 1.

FIGS. 1 to 4 depict a variable capacitor X1 according to a first embodiment of the present invention. FIG. 1 is a plan view showing the variable capacitor X1. FIG. 2 is a fragmentary plan view showing the variable capacitor X1. FIG. 3 is a cross-sectional view taken along the line III-III in FIG. 1. FIG. 4 is an enlarged fragmentary cross-sectional view taken along the line IV-IV in FIG. 1. The variable capacitor X1 includes a substrate 11, a fixed electrode 12, a movable electrode 13 (not shown in FIG. 2), and a dielectric pattern 14.

The substrate 11 is made of a silicon material, for example. On the substrate 11, a predetermined interconnect pattern (not shown) is provided for electrical connection with the fixed electrode 12 or the movable electrode 13.

The fixed electrode 12 is formed in a pattern on the substrate 11, and constitutes a part of a pair of capacitor electrodes provided in the variable capacitor X1. The movable electrode 13 is erected on the substrate 11 as shown in FIG. 3, and constitutes the other part of the pair of capacitor electrodes in the variable capacitor X1. As is apparent from FIG. 1, the fixed electrode 12 and the movable electrode 13 are oriented so as to intersect each other and to partially oppose each other, such that the fixed electrode 12 includes an opposing face 12a opposing the movable electrode 13, and the movable electrode 13 includes an opposing face 13a opposing the fixed electrode 12. The area of the opposing portion of the fixed electrode 12 or opposing face 12a and the movable electrode 13 or opposing face 13a is, for example, 10000 to 40000 μm². The portion of the movable electrode 13 opposing the fixed electrode 12 is of a curved shape protruding toward the fixed electrode 12 as shown in FIG. 4. The distance L shown in FIG. 4 between the fixed electrode 12 and the movable electrode 13 is, for example, 0.5 to 2 μm. The movable electrode 13 has a thickness of, for example, 1 to 2 μm. Preferably, one of the fixed electrode 12 and the movable electrode 13 may be grounded. The fixed electrode 12 and the movable electrode 13 thus configured are constituted of a conductive material, such as aluminum (Al) or copper (Cu).

The dielectric pattern 14 is provided on the opposing face 12a of the fixed electrode 12, and includes a plurality of dielectric islands 14a spaced from each other on the opposing face 12a, in this embodiment. A length per unit area of the dielectric pattern 14 based on the overall length of the outline of the dielectric pattern 14 is longer than a length per unit area of, for example, a rectangular dielectric film assumed to be provided on an entirety of the opposing face 12a, based on the overall length of the outline of such dielectric film. In other words, the total length of the outline of the dielectric pattern 14 on the opposing face 12a is relatively long. Such dielectric pattern 14 serves to prevent a short-circuit between the fixed electrode 12 and the movable electrode 13 in the variable capacitor X1, and is hence formed in such a pattern shape that allows performing the short-circuit prevention (for example, a pattern shape that restricts excessive exposure of the opposing face 12a). The dielectric pattern 14 has a thickness of, for example, 0.1 to 0.5 μm. Suitable materials of the dielectric pattern 14 include alumina ($Al_2O_3$), silicon oxide ($SiO_2$), and silicon nitride ($SiN_x$).

Figure 5:
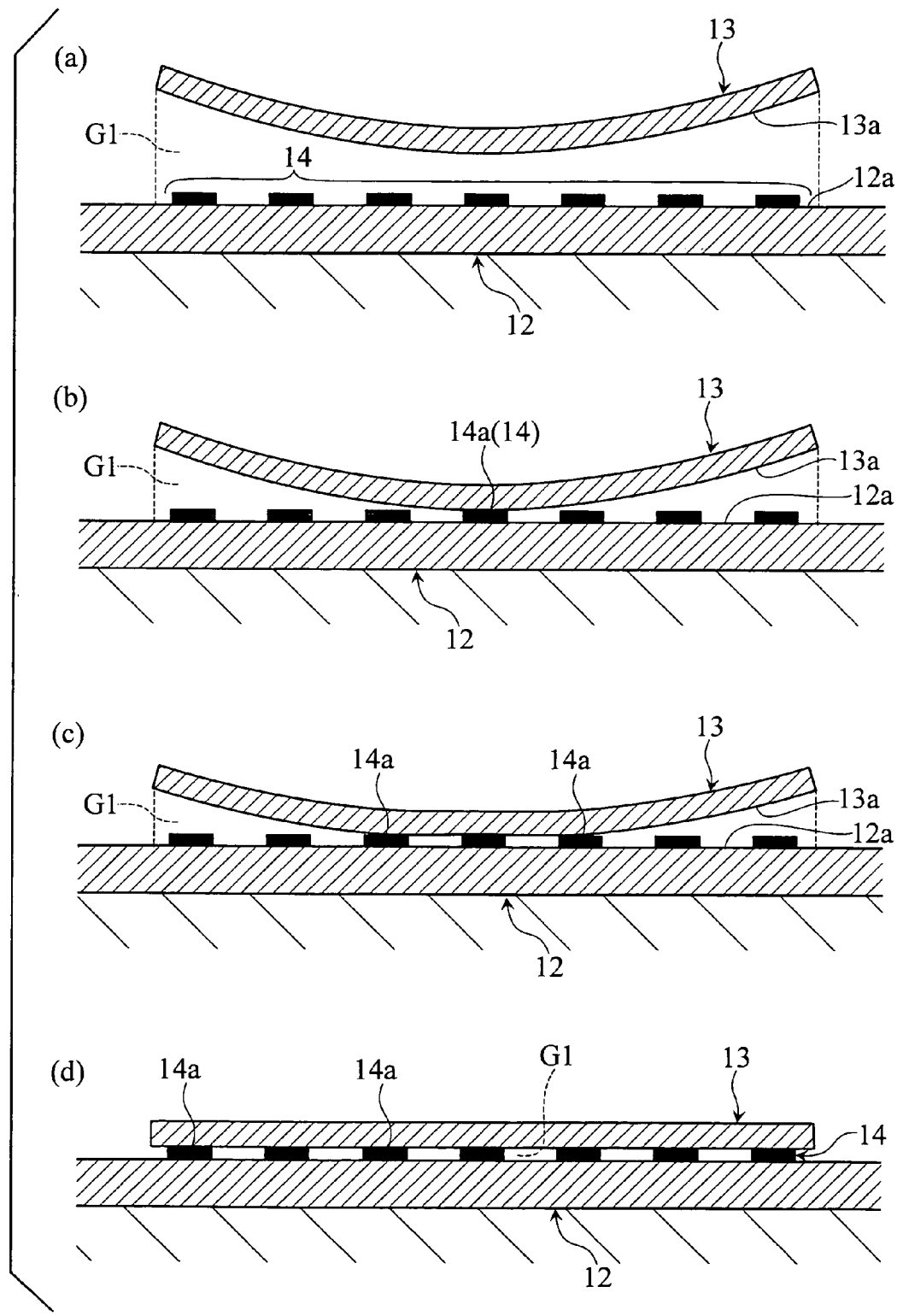
FIG. 5 sequentially shows a driving mode of the variable capacitor shown in FIG. 1.
Figure 6:
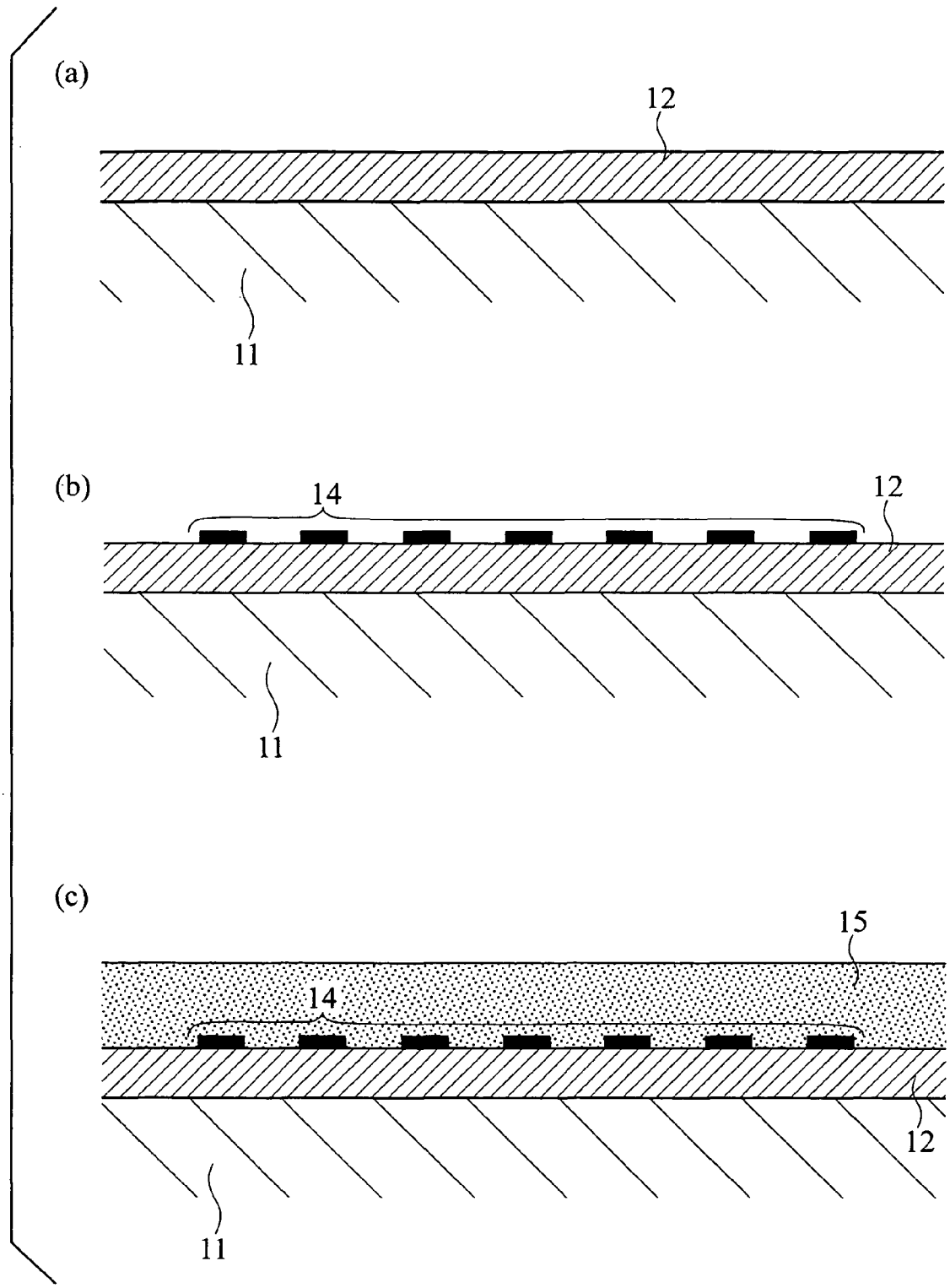
FIG. 6 sequentially shows steps of a manufacturing process of the variable capacitor shown in FIG. 1.
Figure 7:
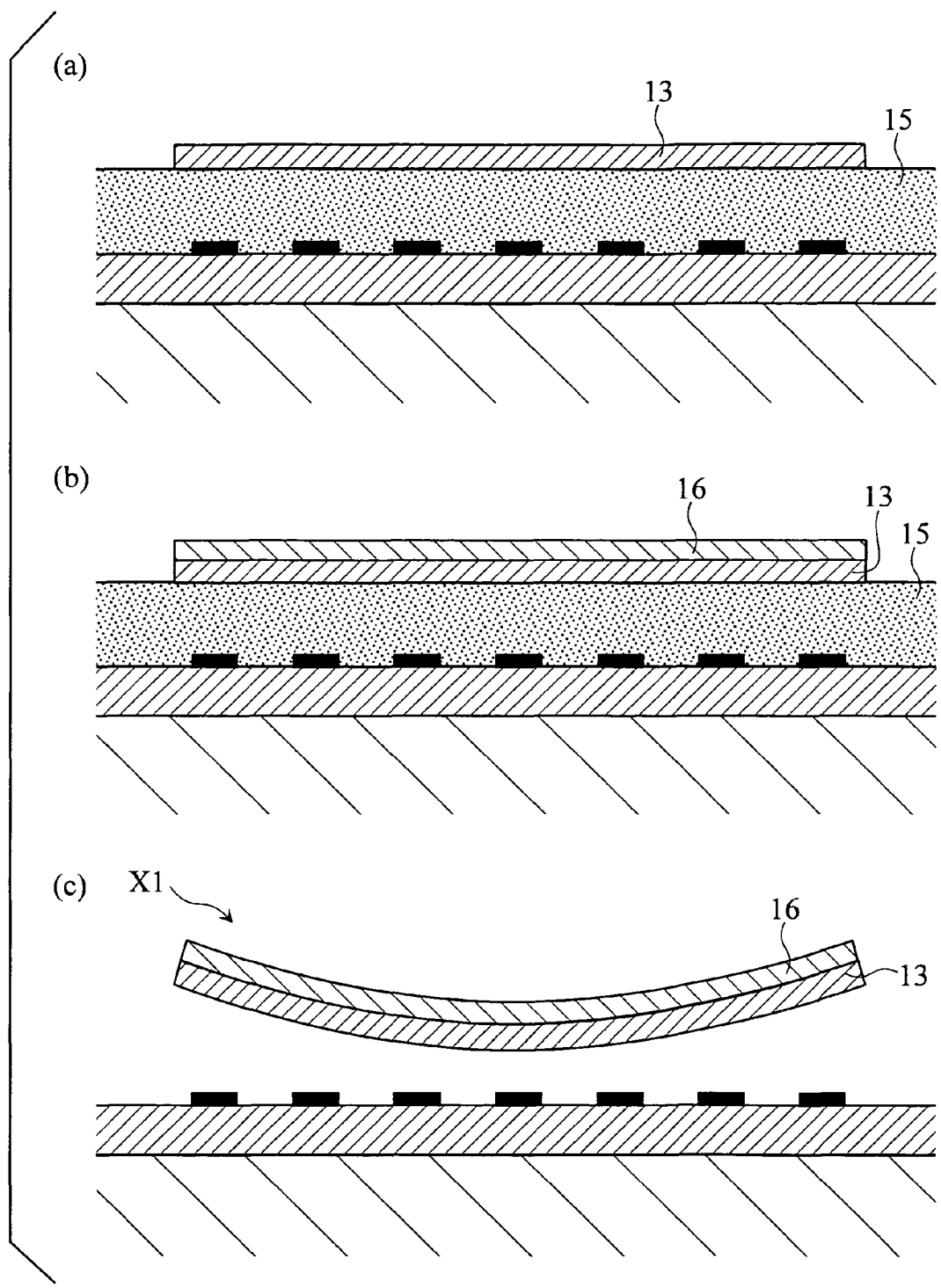
FIG. 7 shows steps subsequent to those of FIG. 6.

In the variable capacitor X1 thus configured, applying a voltage (driving voltage) between the fixed electrode 12 and the movable electrode 13 leads to generation of static attraction between the fixed electrode 12 and the movable electrode 13, to thereby attract the movable electrode 13 to the fixed electrode 12 with the static attraction, thus changing the volume of a gap G1 between the fixed electrode 12 or opposing face 12a and the movable electrode 13 or opposing face 13a, as shown in FIG. 5. Further details of such process are described hereunder.

Since the movable electrode 13 of this variable capacitor X1 is curved as stated above, the spacing between the opposing face 12a of the fixed electrode 12 and the opposing face 13a of the movable electrode 13 is not uniform over the entire region between the opposing faces 12a, 13a, when the both electrodes are in their initial positions (first state), without a voltage being applied between the fixed electrode 12 and the movable electrode 13. In such initial state, the gap G1 has a maximal volume.

Applying a voltage of a predetermined value or greater between the fixed electrode 12 and the movable electrode 13 in the variable capacitor X1 can bring the fixed electrode 12 (opposing face 12a) and the movable electrode 13 (opposing face 13a) to a closest position (second state, as shown in FIG. 5(d)) via the dielectric pattern 14, with the static attraction generated between the electrodes. At this moment, the dielectric pattern 14 prevents the fixed electrode 12 and the movable electrode 13 from directly contacting each other. Under such state, the gap G1 has a minimal volume.

With the gradual increase of the voltage applied between the electrodes of the variable capacitor X1 that causes the transition of the variable capacitor X1 from the first state to the second state, the movable electrode 13 of the curved shape is attracted toward the fixed electrode 12, until the fixed electrode 12 and the movable electrode 13 come into partial contact via the dielectric pattern 14 or dielectric island 14a (in other words, a portion of the fixed electrode 12 and a portion of the movable electrode 13 become closest via the dielectric pattern 14, for example as shown in FIG. 5(b)). Then as shown in FIG. 5(c) for example, the spacing between the electrodes become minimal sequentially from the vicinity of the partial contact portion of the fixed electrode 12 and the movable electrode 13. Finally, as shown in FIG. 5(d), the spacing between the electrodes becomes minimal over the entire region between the fixed electrode 12 (opposing face 12a) and the movable electrode 13 (opposing face 13a).

The variable capacitor X1 can thus continuously change, over an extensive range, the volume of the gap between the electrodes, between the first state where the gap G1 is largest and the second state where the gap G1 is smallest, by controlling the driving voltage (for example, 0 to 20 V) applied between the fixed electrode 12 and the movable electrode 13. The variable capacitor X1 allows, therefore, achieving a large variation range, or variation ratio, of the static capacitance.

Further, in the variable capacitor X1 the dielectric pattern 14 on the opposing face 12a is difficult to be charged. The present inventors have discovered that, when a dielectric film provided on a conductor is electrically charged by bringing a conductor material or the like into contact with the dielectric film under a predetermined condition (i.e. when the dielectric film is charged by what is known as charge transfer from outside to the dielectric film), the extent of the charge is more alleviated when a length per unit area of the dielectric film provided on the conductor, based on the overall length of the outline of the dielectric film, is longer. Whereas the electrical charges (electrons, or holes) concentrate in the vicinity of an exposed surface of the dielectric film when the dielectric film is charged by the so-called charge transfer, it can be presumed that a greater amount of charge immigrates from the vicinity of the exposed surface of the dielectric film to the surface of the conductor disposed in contact therewith, when the length per unit area of the dielectric film based on the overall length of the outline of the dielectric film is longer. Presumably, this is one of the reasons of the alleviation of the charging extent.

In the variable capacitor X1, the total length of the outline of the dielectric pattern 14 formed in a predetermined pattern on the opposing face 12a is relatively long, as already stated (in other words, the length per unit area of the dielectric pattern 14 based on the overall length of the outline of the dielectric pattern 14 is relatively long), and hence the charge can readily immigrate from the dielectric pattern 14 to the opposing face 12a. Accordingly, the dielectric pattern 14 in the variable capacitor X1 is prevented from being charged by the so-called charge transfer. In the variable capacitor X1, therefore, the minimum driving voltage, to be applied between the movable electrode 13 and the fixed electrode 12 so as to cause the movable electrode 13 to move from its initial position, can be prevented from fluctuating, and also the relationship between the static capacitance and the driving voltage (voltage to be applied between the electrodes to attain the predetermined static capacitance, or volume of the gap between the electrodes) for driving the variable capacitor X1, or the movable electrode 13 thereof, can be prevented from fluctuating. The variable capacitor X1 can thus suppress the fluctuation of the driving voltage characteristic.

FIG. 6(a) to 7(c) are cross-sectional views corresponding to FIG. 4, representing an example of a manufacturing process of the variable capacitor X1. The following process is based on the so-called MEMS technique, for manufacturing the variable capacitor X1.

To manufacture the variable capacitor X1, firstly the fixed electrode 12 is formed as shown in FIG. 6(a). For example, a sputtering process may be employed to deposit Al on the substrate 11, and then an etching process may be performed on the Al layer utilizing a predetermined resist pattern as the mask, to thereby form the fixed electrode 12 in a pattern on the substrate 11.

Then as shown in FIG. 6(b), the dielectric pattern 14 is formed. For example, a sputtering process may be employed to deposit an $Al_2O_3$ layer over the fixed electrode 12 and the substrate 11, and then an etching process may be performed on the $Al_2O_3$ layer utilizing a predetermined resist pattern as the mask, to thereby form the dielectric pattern 14 in a pattern on the fixed electrode 12.

Referring then to FIG. 6(c), a sacrifice layer 15 is formed. The sacrifice layer 15 includes an opening (not shown) through which the substrate 11 is to be partially exposed. The portion of the substrate 11 exposed through the opening serves for connection with the movable electrode 13. The sacrifice layer 15 may be formed of a photoresist. To form the sacrifice layer 15, for example a sputtering process may be performed to deposit the sacrifice layer material on the substrate 11 so as to cover the fixed electrode 12 and the dielectric pattern 14, and then an etching process may be performed on such layer, utilizing a predetermined resist pattern as the mask.

Proceeding to FIG. 7(a), the movable electrode 13 is formed. To form the movable electrode 13, for example a sputtering process may be employed to deposit Al on the sacrifice layer 15 and the foregoing opening, and then an etching process may be performed on the Al layer utilizing a predetermined resist pattern as the mask.

Then as shown in FIG. 7(b), a material layer 16 is formed on the movable electrode 13. More specifically, a sputtering process may be performed under a predetermined high temperature to deposit a predetermined material on the movable electrode 13 and the sacrifice layer 15, and then an etching process may be performed on the material layer utilizing a predetermined resist pattern as the mask. The material layer 16 serves to achieve the curved shape of the movable electrode 13, and is constituted of a material having a higher thermal expansion coefficient than the material of the movable electrode 13. Suitable materials of the material layer 16 include zinc and tin. Upon decreasing the temperature after the foregoing process, the material layer 16 obtains therein greater shrinking force than in the movable electrode 13.

Finally the sacrifice layer 15 is removed as shown in FIG. 7(c). To be more detailed, a predetermined resist stripping solution may be employed to perform a wet etching process, to thereby remove the sacrifice layer 15. Upon removing the sacrifice layer 15, the material layer 16 shrinks by a larger extent than the movable electrode 13, thereby partially bending the movable electrode 13. Through the foregoing process for example, the variable capacitor X1 can be manufactured. The material layer 16, which is an example of methods for bending the movable electrode 13, is not shown in FIG. 1 and some of other drawings.

Figure 8:
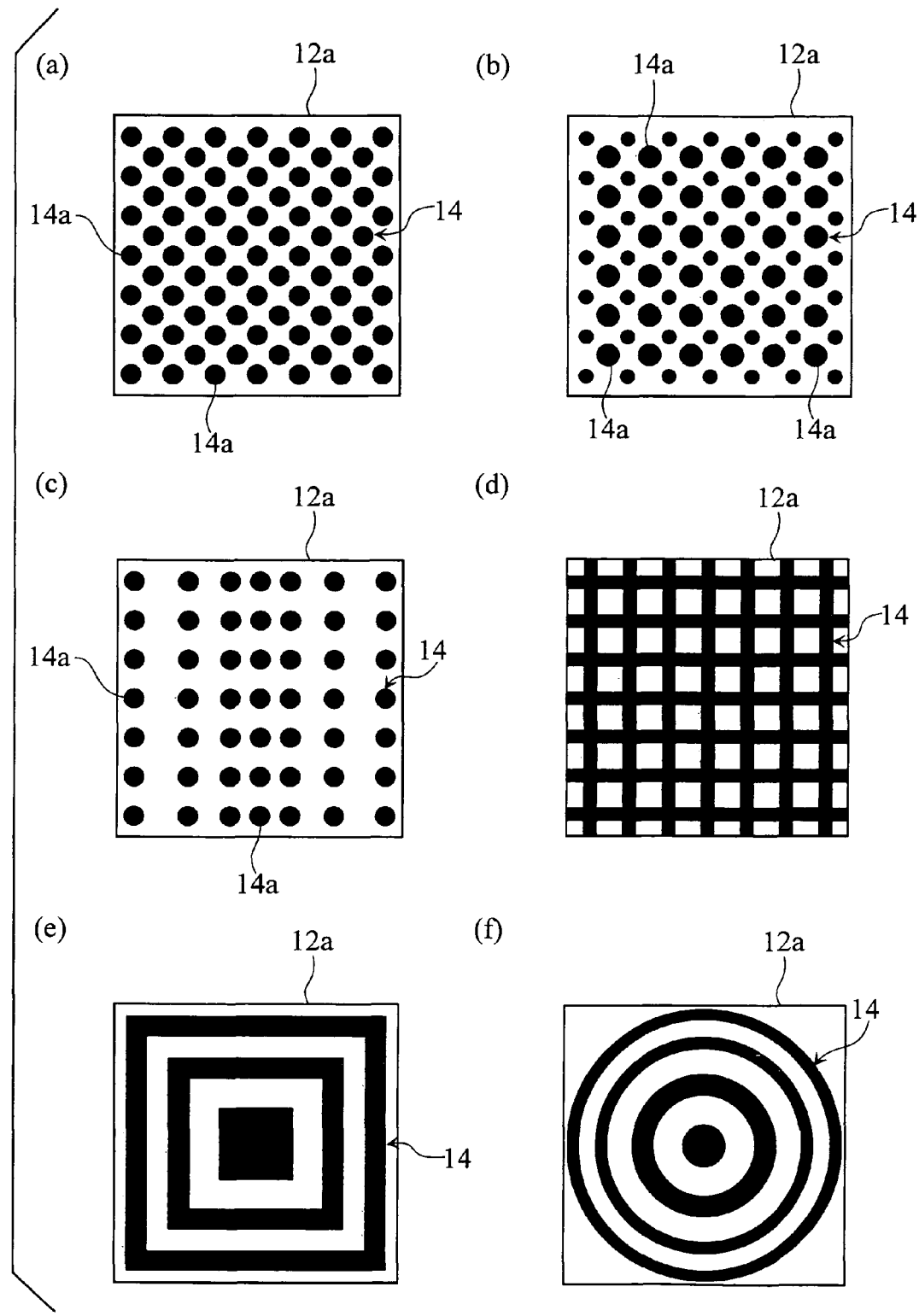
FIG. 8 is a plan view showing variations of a dielectric pattern.

FIG. 8(a)-(f) illustrates variations of the dielectric pattern 14 formed on the opposing face 12a of the fixed electrode 12. In the variable capacitor X1, a C-V (static capacitance-driving voltage) characteristic may be adjusted by controlling the shape or the density of the dielectric pattern 14 disposed between the fixed electrode 12 and the movable electrode 13. More specifically, controlling the shape and density of the dielectric pattern 14 or selecting the material thereof allows adjusting a maximum static capacitance F max of the variable capacitor X1 and a static capacitance fluctuation ratio ΔF represented by a C-V characteristic curve. For example, the more dense the dielectric pattern 14 is, the greater the static capacitance fluctuation ratio ΔF tends to become. Also, in the variable capacitor X1 in which, for example, the dielectric islands 14a are evenly distributed in the dielectric pattern 14, gradually increasing the driving voltage, so as to cause a transition from the state described referring to FIG. 5(b) to the state described referring to FIG. 5(d) (the second state), may lead to an increase of the static capacitance according to a second order function, with the increase of the driving voltage, however, in the case where the dielectric islands 14a are, as shown in FIG. 8(c), less densely distributed in a peripheral region of the dielectric pattern 14 where the contact with the movable electrode 13 is made with a delay, the increase of the static capacitance with the increase of the driving voltage becomes milder and proximate to an increase according to a first order function. The variation control of the static capacitance can be more easily performed when the increase thereof with the increase of the driving voltage is proximate to a first order function, than to a second order function.

Figure 9:
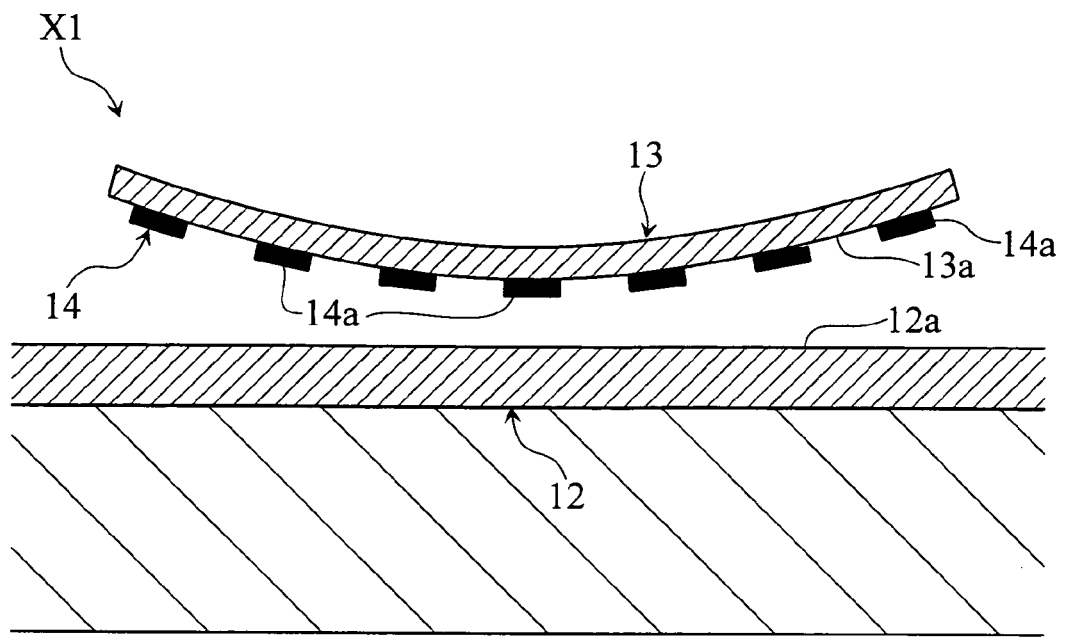
FIG. 9 is a fragmentary cross-sectional view of a first variation of the variable capacitor shown in FIG. 1.

FIG. 9 is a cross-sectional view of a first variation of the variable capacitor X1. In the variable capacitor X1, the dielectric pattern 14 may be provided on the opposing face 13a of the movable electrode 13, instead of on the opposing face 12a of the fixed electrode 12.

Figure 10:
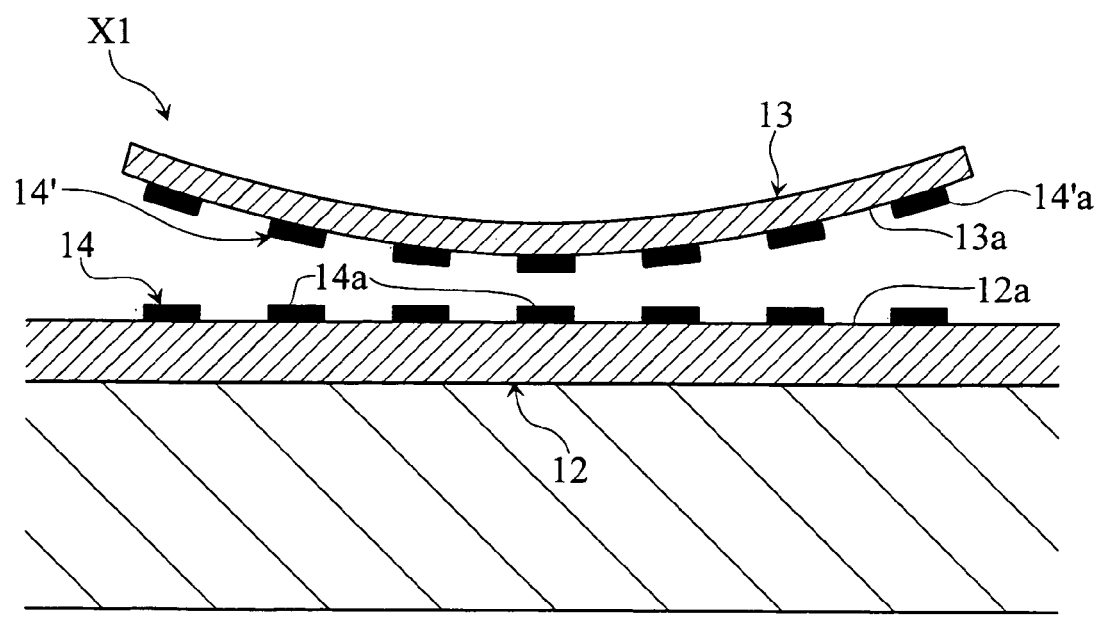
FIG. 10 is a fragmentary cross-sectional view of a second variation of the variable capacitor shown in FIG. 1.

FIG. 10 is a cross-sectional view of a second variation of the variable capacitor X1. In the variable capacitor X1, a dielectric pattern 14' may be provided on the opposing face 13a of the movable electrode 13, in addition to the dielectric pattern 14 provided on the opposing face 12a of the fixed electrode 12. The dielectric patterns 14, 14' are of the same shape, and include the plurality of dielectric islands 14'a. Such structure inhibits the movable electrode 13 from directly contacting the dielectric pattern 14.

Figure 11:
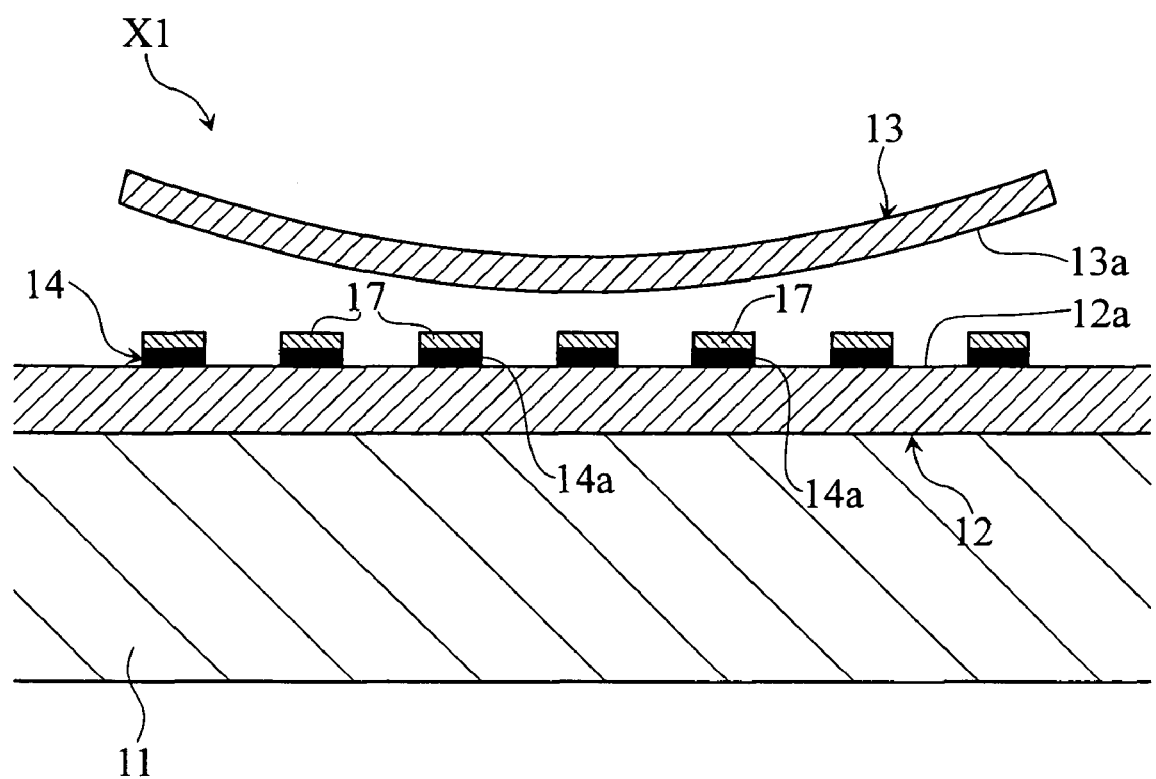
FIG. 11 is a fragmentary cross-sectional view of a third variation of the variable capacitor shown in FIG. 1.

FIG. 11 is a cross-sectional view of a third variation of the variable capacitor X1. In the variable capacitor X1, a conductor layer 17 may be provided on the dielectric pattern 14. The conductor layer 17 is formed of, for example, nickel or titanium. Such structure inhibits the movable electrode 13 from directly contacting the dielectric pattern 14. Also, the dielectric pattern 14 with the conductor layer 17 may be provided on the opposing face 13a of the movable electrode 13, instead of on the opposing face 12a of the fixed electrode 12.

Figure 12:
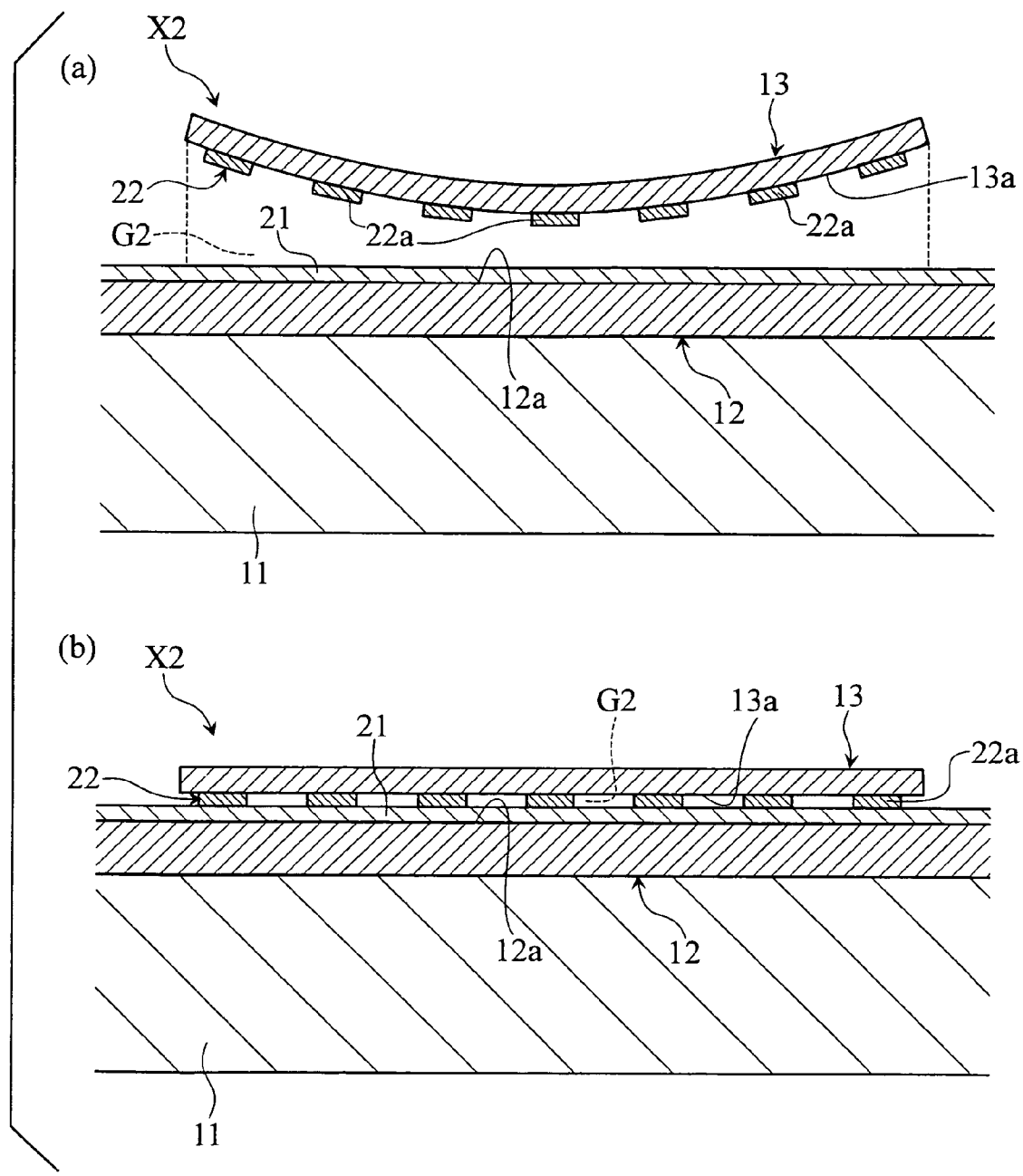
FIG. 12 shows, in section, a variable capacitor according to a second embodiment of the present invention.

FIG. 12(a)-(b) is a fragmentary cross-sectional view showing a variable capacitor X2 according to a second embodiment of the present invention. The variable capacitor X2 includes the substrate 11, the fixed electrode 12, the movable electrode 13 of a curved shape, a dielectric film 21, and a conductor pattern 22. The variable capacitor X2 is different from the variable capacitor X1 in including the dielectric film 21 and the conductor pattern 22, in place of the dielectric pattern 14.

Figure 13:
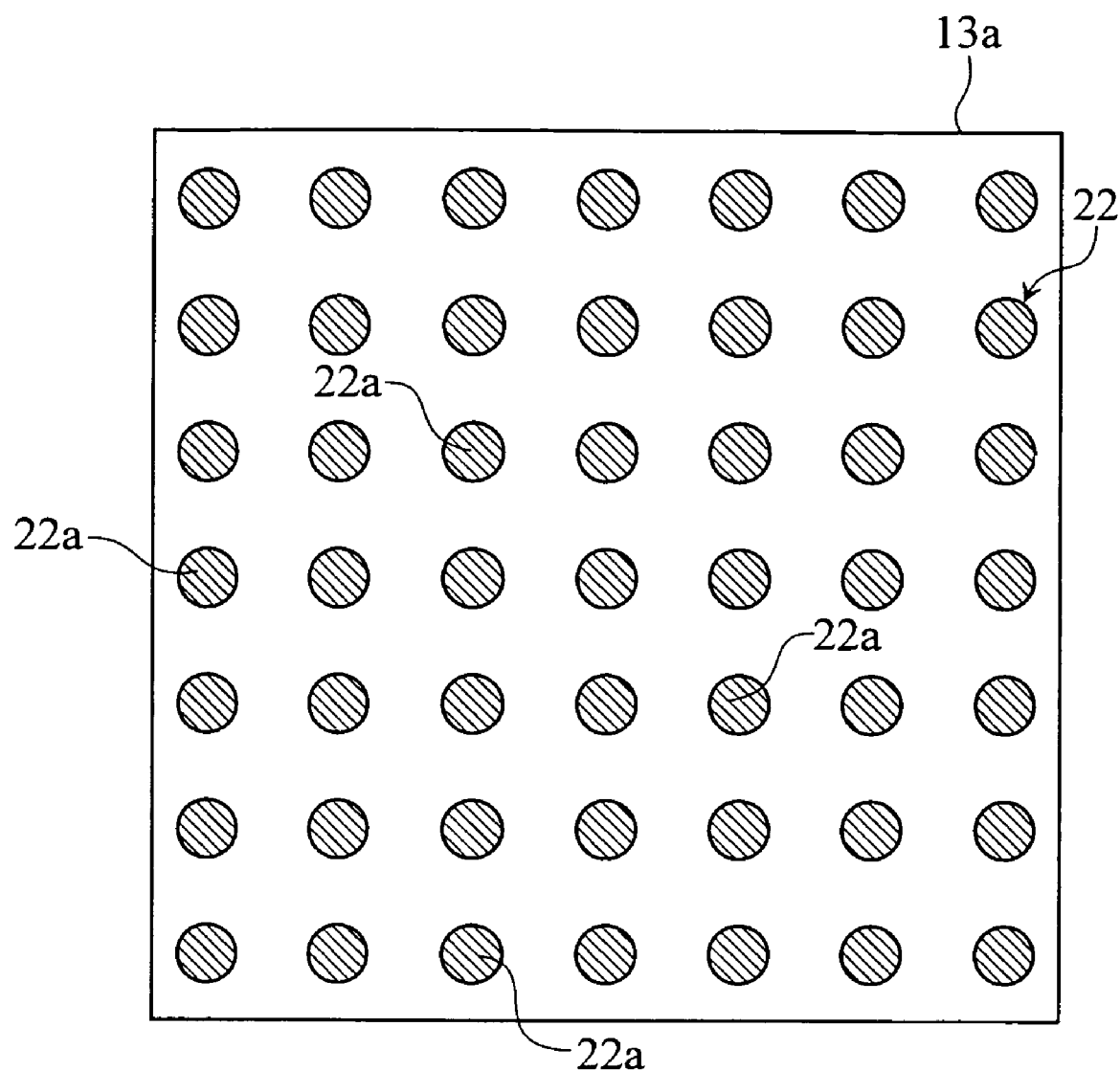
FIG. 13 is a plan view showing a conductor pattern according to the second embodiment.

The dielectric film 21 in the variable capacitor X2 serves to prevent a short-circuit between the fixed electrode 12 and the movable electrode 13. The dielectric film 21 is formed of a silicon oxide film, for example. The conductor pattern 22 is formed in a pattern on the opposing face 13a of the movable electrode 13, and includes a plurality of conductor islands 22a spaced from each other, for example as shown in FIG. 13. The surface of the conductor pattern 22 opposing the dielectric film 21 is smaller in area than the opposing face 13a. The conductor pattern 22 may be formed of nickel or titanium.

The variable capacitor X2 may be driven in a similar manner to that described regarding the variable capacitor X1, and can continuously change, over an extensive range, the volume of the gap G2 between the electrodes, between the first state where the gap G2 is largest (initial state as shown in FIG. 12(a)) and the second state where the gap G2 is smallest as shown in FIG. 12(b). The variable capacitor X2 is, therefore, capable of achieving a large variation amount, or variation ratio, of the static capacitance, like the variable capacitor X1.

In the variable capacitor X2, the conductor pattern 22 on the opposing face 13a of the movable electrode 13 comes into direct contact with the dielectric film 21 on the opposing face 12a of the fixed electrode 12, under the second state, for example as shown in FIG. 12(b). The structure that the surface of the conductor pattern 22 opposing the dielectric film 21 is smaller in area than the opposing face 13a contributes to suppressing the charge transfer originating from the contact between the conductor material and the dielectric film 21. In the variable capacitor X2, therefore, the dielectric film 21 can be prevented from being charged by the so-called charge transfer, and the driving voltage characteristic can be prevented from fluctuating.

Figure 14:
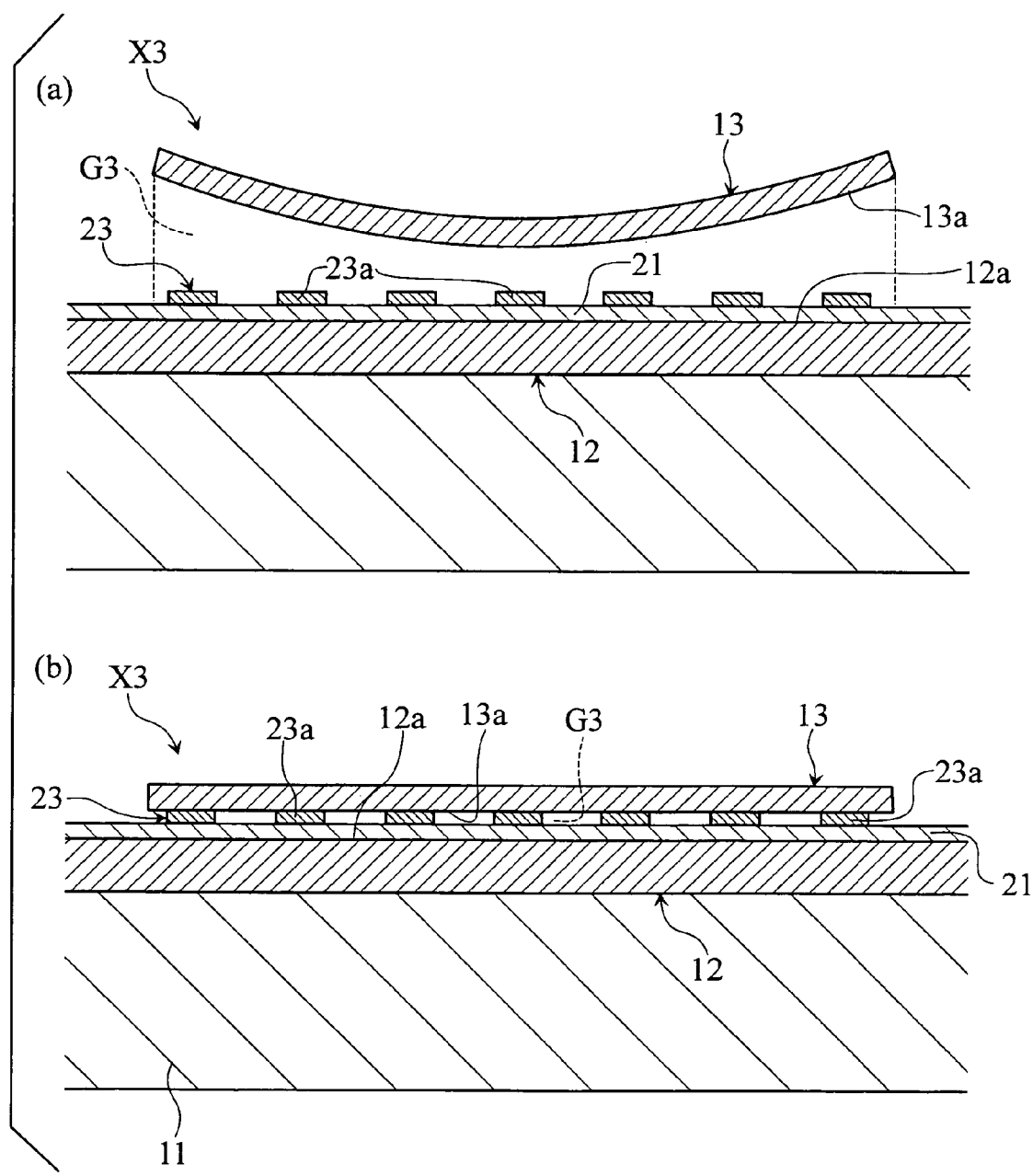
FIG. 14 shows, in section, a variable capacitor according to a third embodiment of the present invention.

FIG. 14(a)-(b) is a fragmentary cross-sectional view showing a variable capacitor X3 according to a third embodiment of the present invention. The variable capacitor X3 includes the substrate 11, the fixed electrode 12, the movable electrode 13 of a curved shape, the dielectric film 21, and a conductor pattern 23. The variable capacitor X3 is different from the variable capacitor X1 in including the dielectric film 21 and the conductor pattern 23, in place of the dielectric pattern 14.

Figure 15:
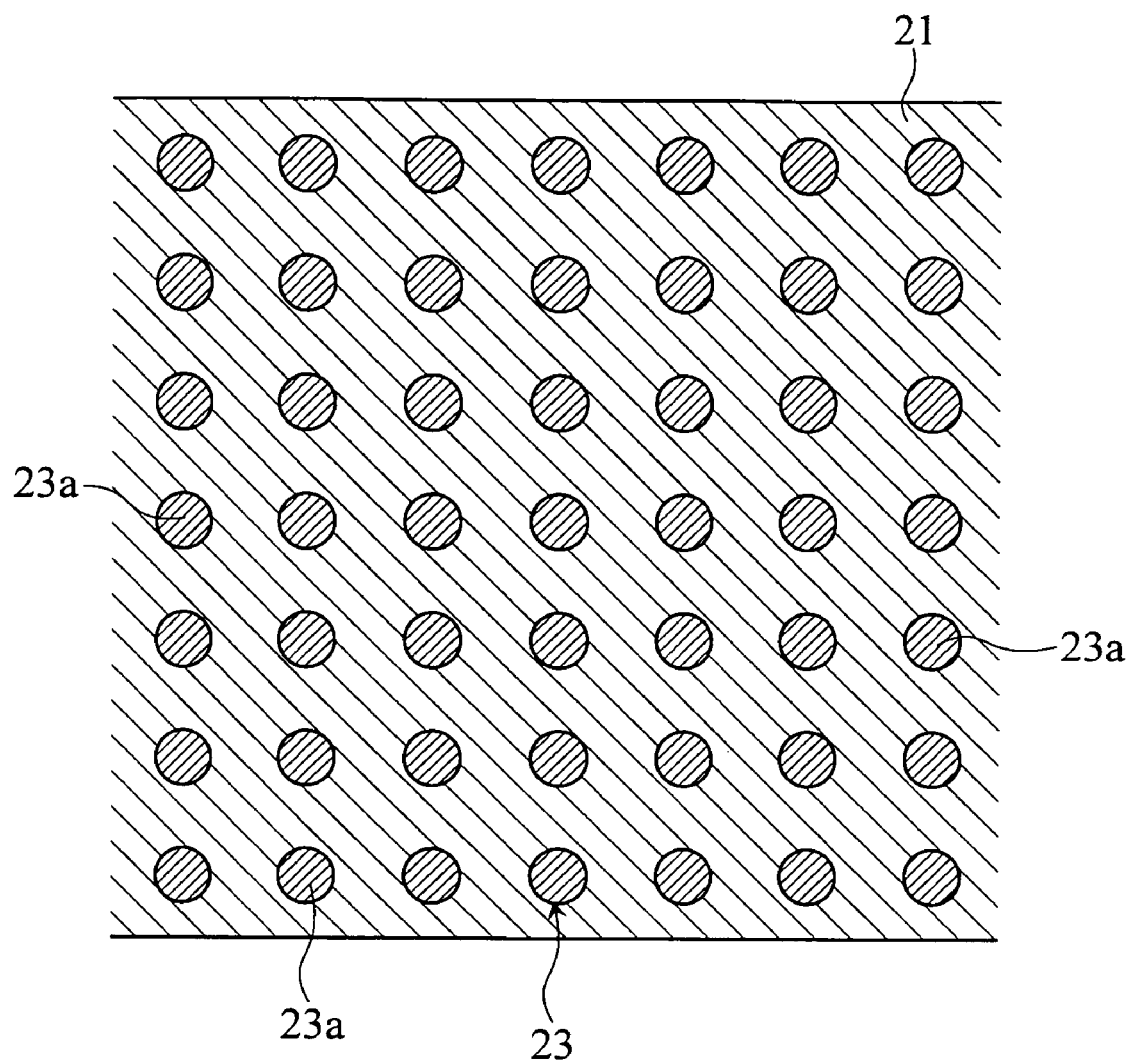
FIG. 15 is a plan view showing a conductor pattern according to the third embodiment.

The dielectric film 21 in the variable capacitor X3 serves to prevent a short-circuit between the fixed electrode 12 and the movable electrode 13. The conductor pattern 23 is formed in a pattern on the dielectric film 21, and includes a plurality of conductor islands 23a spaced from each other, for example as shown in FIG. 15. The conductor pattern 23 occupies a smaller area on the dielectric film 21, than the dielectric film 21 located thereunder. The conductor pattern 23 may be formed of nickel or titanium.

The variable capacitor X3 may be driven in a similar manner to that described regarding the variable capacitor X1, and can continuously change, over an extensive range, the volume of the gap G3 between the electrodes, between the first state where the gap G3 is largest (initial state as shown in FIG. 14(a)) and the second state where the gap G3 is smallest as shown in FIG. 14(b). The variable capacitor X3 is, therefore, capable of achieving a large variation amount, or variation ratio, of the static capacitance, like the variable capacitor X1.

In the variable capacitor X3, the conductor pattern 23 on the dielectric film 21 comes into direct contact with the movable electrode 13 (opposing face 13a) under the second state, for example as shown in FIG. 14(b). In the case where conductors make mutual contact, the so-called charge transfer is less likely to take place. Further, the structure that the conductor pattern 23 is smaller in area than the dielectric film 21 contributes to suppressing the charge transfer originating from the contact between the movable electrode 13 and the conductor pattern 23. Accordingly, in the variable capacitor X3 the amount of the charge transfer from the conductor pattern 23 to the dielectric film 21 can be restricted. In the variable capacitor X3, therefore, the dielectric film 21 can be prevented from being charged, and the driving voltage characteristic can be prevented from fluctuating.

Figure 16:
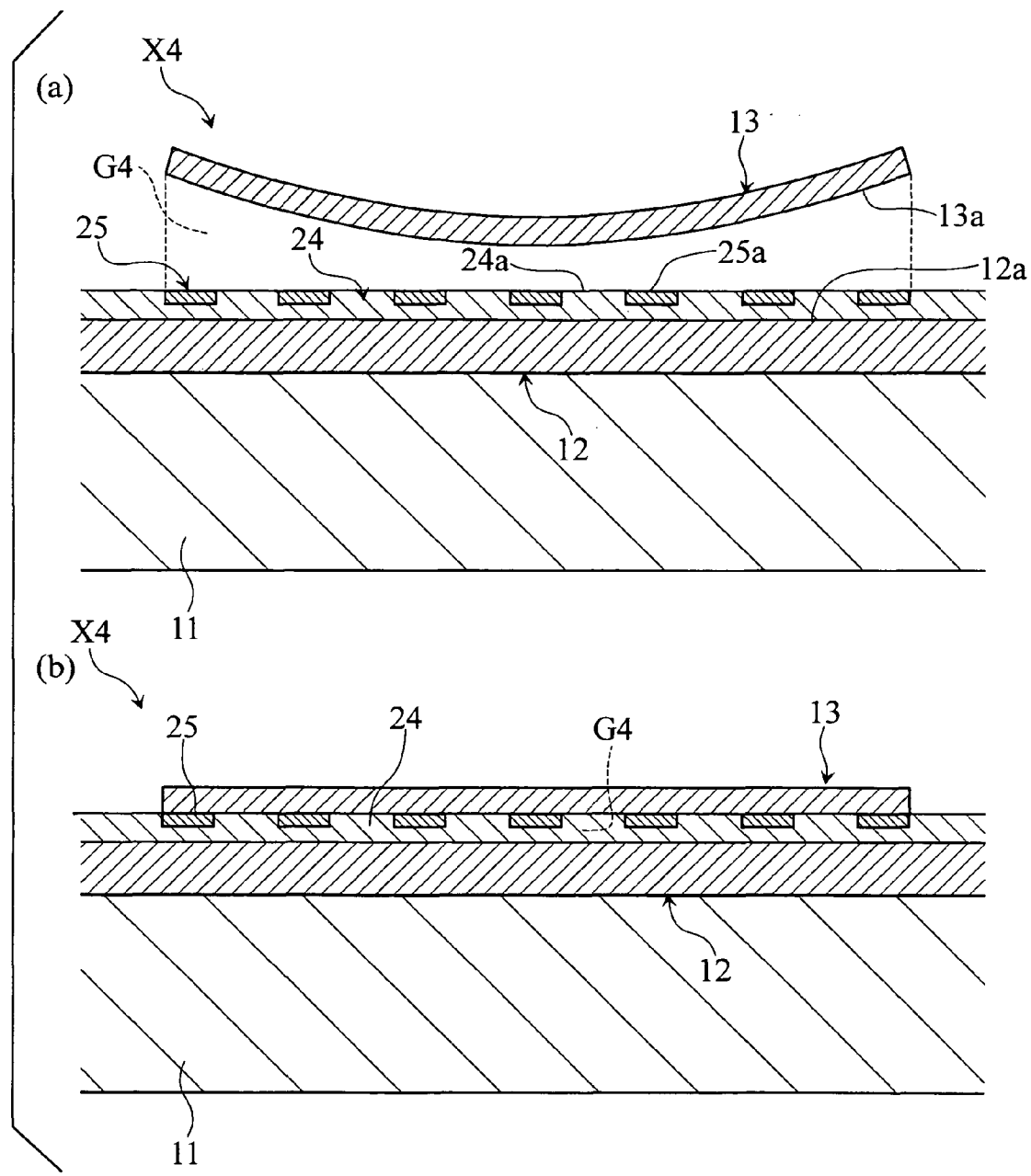
FIG. 16 shows, in section, a variable capacitor according to a fourth embodiment of the present invention.
Figure 17:
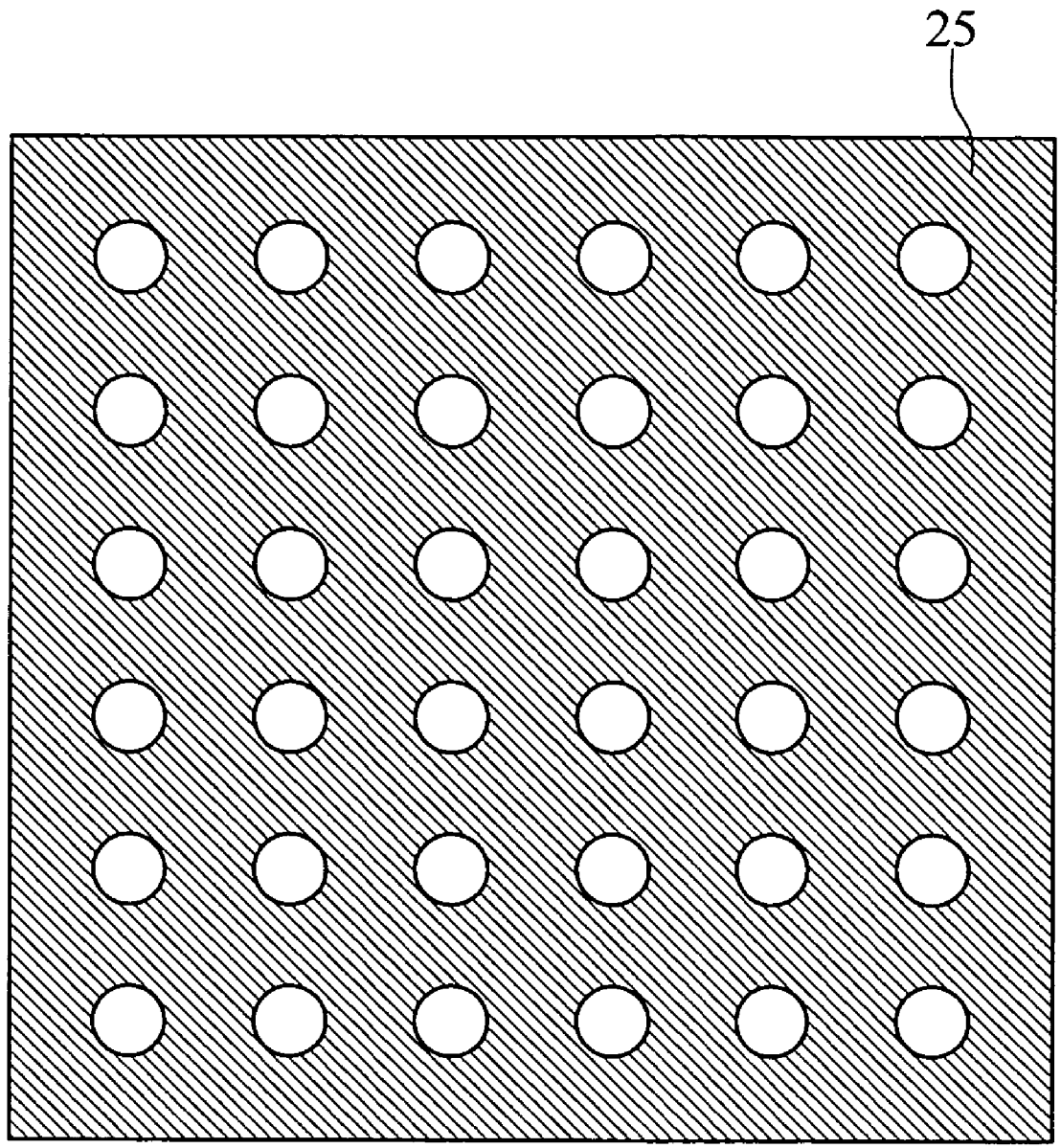
FIG. 17 is a plan view showing a conductor pattern buried in a dielectric film according to the fourth embodiment.

FIG. 16(a)-(b) is a fragmentary cross-sectional views showing a variable capacitor X4 according to a fourth embodiment of the present invention. The variable capacitor X4 includes the substrate 11, the fixed electrode 12, the movable electrode 13 of a curved shape, a dielectric film 24 and a conductor pattern 25. The variable capacitor X4 is different from the variable capacitor X1 in including the dielectric film 24 and the conductor pattern 25 in place of the dielectric pattern 14. The dielectric film 24 in the variable capacitor X4 serves to prevent a short-circuit between the fixed electrode 12 and the movable electrode 13. The conductor pattern 25 is formed in a predetermined pattern, and includes, for example as shown in FIG. 17, a plurality of openings through which the dielectric film 24 is partially exposed. The surface 24a of the dielectric film 24 and the surface 25a of the conductor pattern 25 are flush with each other. The dielectric film 24 is formed of alumina for example, and the conductor pattern 25 is formed of aluminum, for example.

The variable capacitor X4 may be driven in a similar manner to that described regarding the variable capacitor X1, and can continuously change, over an extensive range, the volume of the gap G4 between the electrodes, between the first state where the gap G4 is largest (initial state as shown in FIG. 16(a)) and the second state where the gap G4 is smallest as shown in FIG. 16(b). The variable capacitor X4 is, therefore, capable of achieving a large variation amount, or variation ratio, of the static capacitance, like the variable capacitor X1.

In the variable capacitor X4, although the electrical charge originating from the so-called charge transfer concentrates at the exposed surface of the dielectric film 24, the charge can readily immigrate to the conductor pattern 25 buried in the dielectric film 24. In the variable capacitor X4, therefore, the dielectric film 24 can be prevented from being charged, and the driving voltage characteristic can be prevented from fluctuating.

Figure 18:
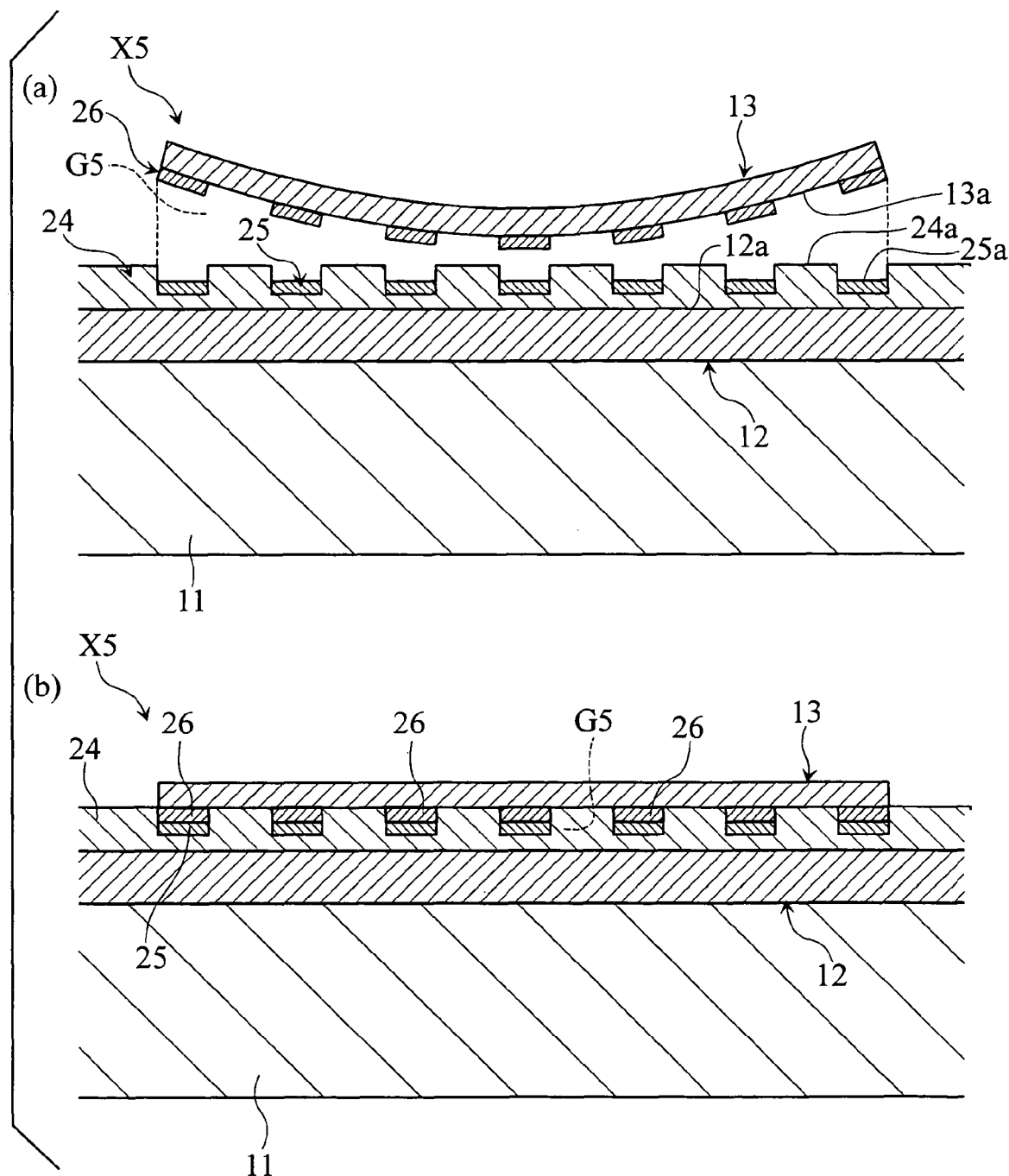
FIG. 18 shows, in section, a variable capacitor according to a fifth embodiment of the present invention.
Figure 19:
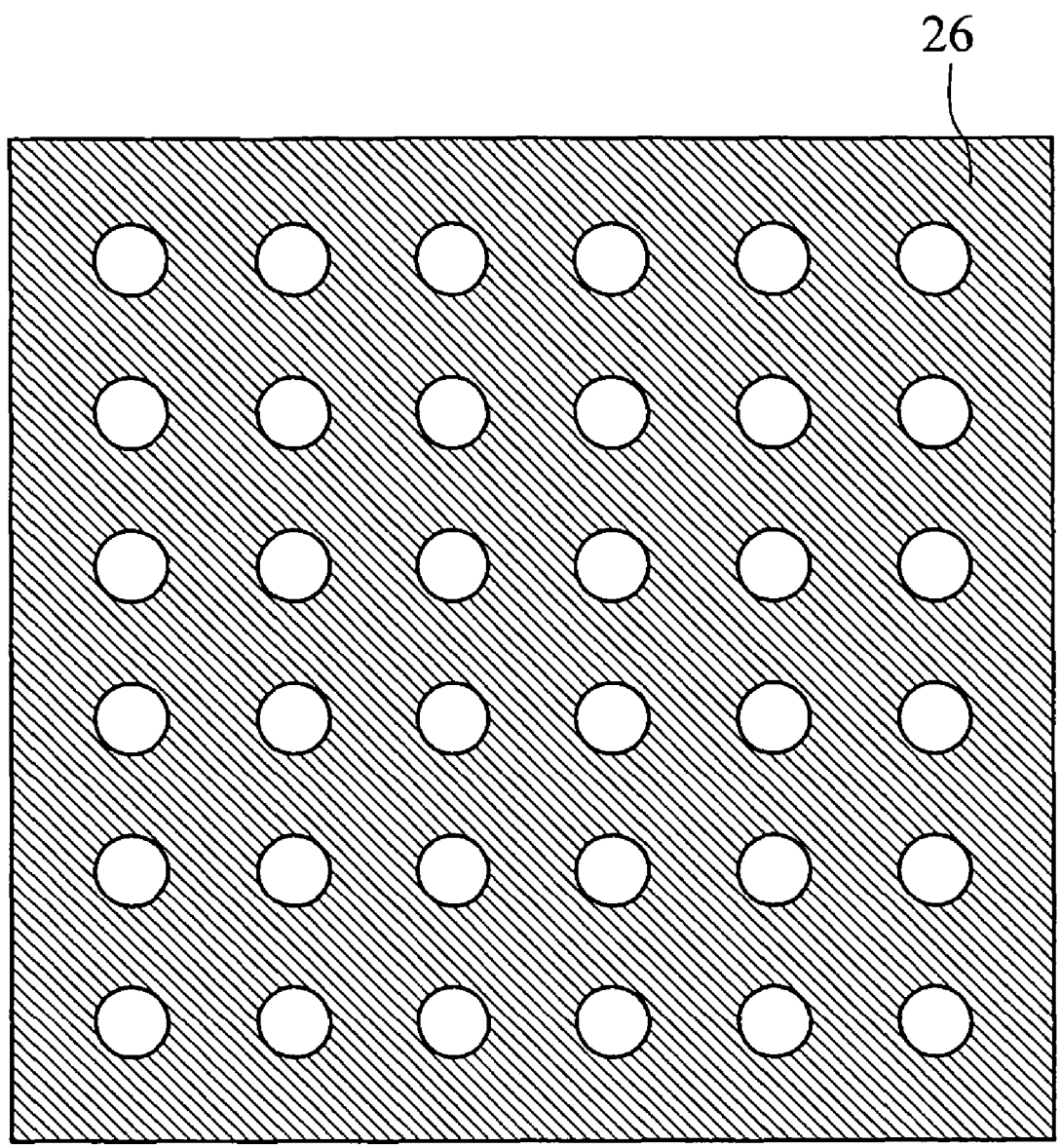
FIG. 19 is a plan view showing a conductor pattern provided on a movable electrode according to the third embodiment.

FIG. 18(a)-(b) is a fragmentary cross-sectional views showing a variable capacitor X5 according to a fifth embodiment of the present invention. The variable capacitor X5 includes the substrate 11, the fixed electrode 12, the movable electrode 13 of a curved shape, the dielectric film 24 and conductor patterns 25, 26. The variable capacitor X5 is different from the variable capacitor X1 in including the dielectric film 24 and the conductor patterns 25, 26 in place of the dielectric pattern 14. The dielectric film 24 in the variable capacitor X5 serves to prevent a short-circuit between the fixed electrode 12 and the movable electrode 13. The conductor pattern 25 is formed in a predetermined pattern, and includes a plurality of openings through which the dielectric film 24 is partially exposed. In this embodiment, the surface 25a of the conductor pattern 25 is recessed toward the fixed electrode 12, with respect to the surface 24a of the dielectric film 24. The conductor pattern 26 has the same pattern shape as the conductor pattern 25, and includes a plurality of openings, for example as shown in FIG. 19. The conductor pattern 26 is formed of nickel or titanium, for example.

The variable capacitor X5 may be driven in a similar manner to that described regarding the variable capacitor X1, and can continuously change, over an extensive range, the volume of the gap G5 between the electrodes, between the first state where the gap G5 is largest (initial state as shown in FIG. 18(a)) and the second state where the gap G5 is smallest as shown in FIG. 18(b) (in the second state, the dielectric film 24 and the movable electrode 13 are in mutual contact, and the conductor patterns 25, 26 are in mutual contact). The variable capacitor X5 is, therefore, capable of achieving a large variation amount, or variation ratio, of the static capacitance, like the variable capacitor X1.

In the variable capacitor X5, although the electrical charge originating from the so-called charge transfer concentrates at the exposed surface of the dielectric film 24, the charge can readily immigrate to the conductor pattern 25 buried in the dielectric film 24. In the variable capacitor X5, therefore, the dielectric film 24 can be prevented from being charged, and the driving voltage characteristic can be prevented from fluctuating.

Figure 20:
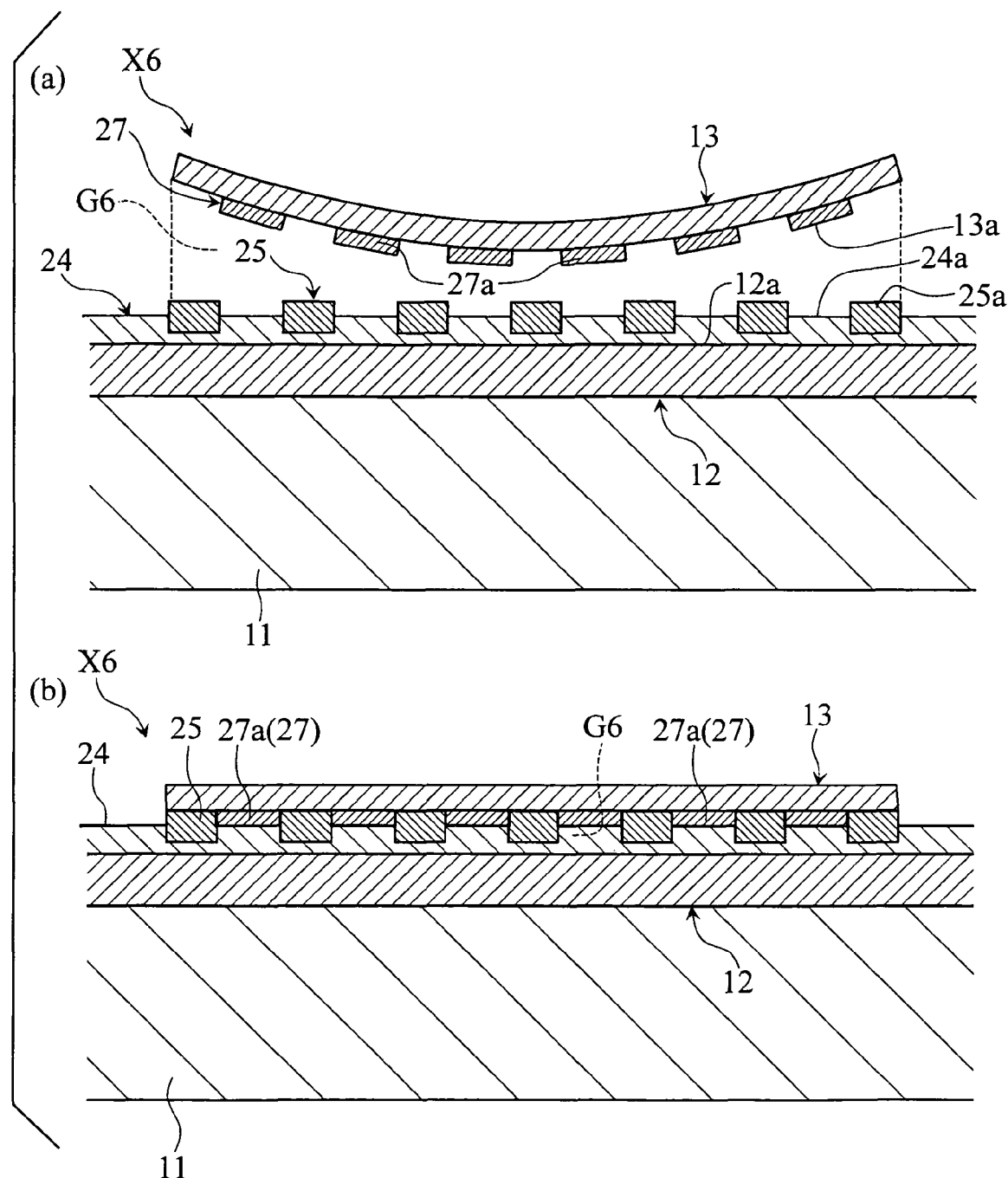
FIG. 20 shows, in section, a variable capacitor according to a sixth embodiment of the present invention.
Figure 21:
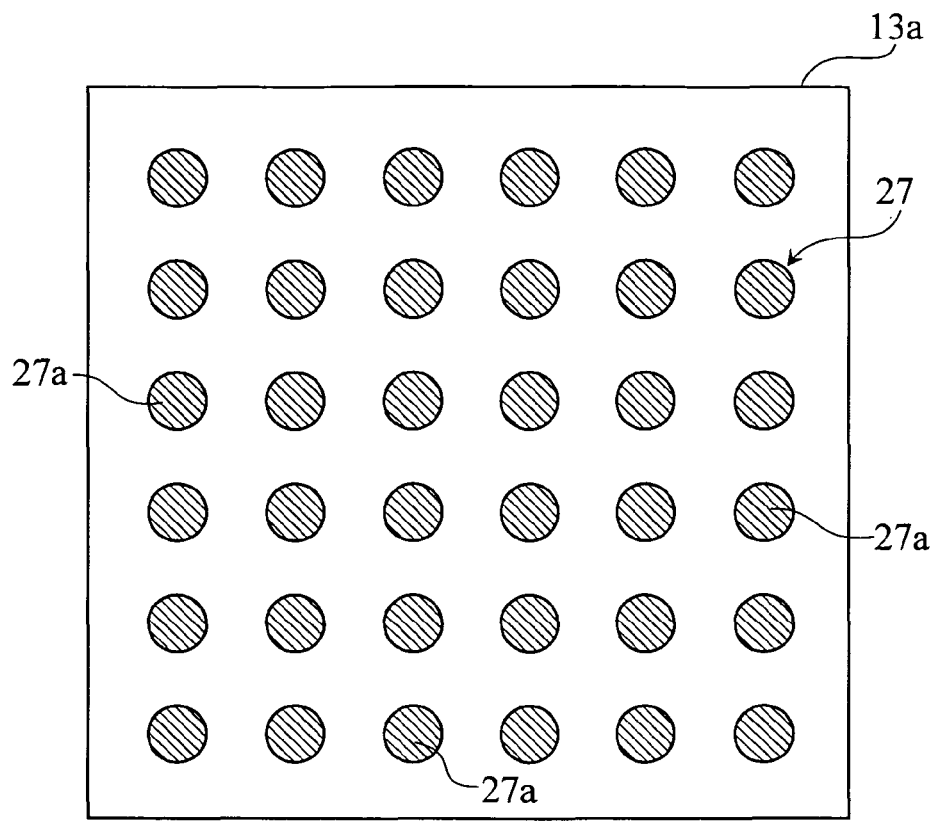
FIG. 21 is a plan view showing a conductor pattern provided on a movable electrode according to the sixth embodiment.

FIG. 20(a)-(b) is a fragmentary cross-sectional views showing a variable capacitor X6 according to a sixth embodiment of the present invention. The variable capacitor X6 includes the substrate 11, the fixed electrode 12, the movable electrode 13 of a curved shape, the dielectric film 24 and conductor patterns 25, 27. The variable capacitor X6 is different from the variable capacitor X1 in including the dielectric film 24 and the conductor patterns 25, 27 in place of the dielectric pattern 14. The dielectric film 24 in the variable capacitor X6 serves to prevent a short-circuit between the fixed electrode 12 and the movable electrode 13. The conductor pattern 25 is formed in a predetermined pattern, and includes a plurality of openings through which the dielectric film 24 is partially exposed. In this embodiment, the surface 24a of the dielectric film 24 is recessed toward the fixed electrode 12, with respect to the surface 25a of the conductor pattern 25. The conductor pattern 27 has a pattern shape corresponding to the openings of the conductor pattern 25, and includes a plurality of conductor islands 27a, for example as shown in FIG. 21. The conductor pattern 27 is formed of nickel or titanium, for example.

The variable capacitor X6 may be driven in a similar manner to that described regarding the variable capacitor X1, and can continuously change, over an extensive range, the volume of the gap G6 between the electrodes, between the first state where the gap G6 is largest (initial state as shown in FIG. 20(a)) and the second state where the gap G6 is smallest as shown in FIG. 20(b) (in the second state, the dielectric film 24 and the conductor pattern 27 are in mutual contact, and the movable electrode 13 and the conductor pattern 25 are in mutual contact). The variable capacitor X6 is, therefore, capable of achieving a large variation amount, or variation ratio, of the static capacitance, like the variable capacitor X1.

In the variable capacitor X6, although the electrical charge originating from the so-called charge transfer concentrates at the exposed surface of the dielectric film 24, the charge can readily immigrate to the conductor pattern 25 buried in the dielectric film 24. In the variable capacitor X6, therefore, the dielectric film 24 can be prevented from being charged, and the driving voltage characteristic can be prevented from fluctuating.

Figure 22:
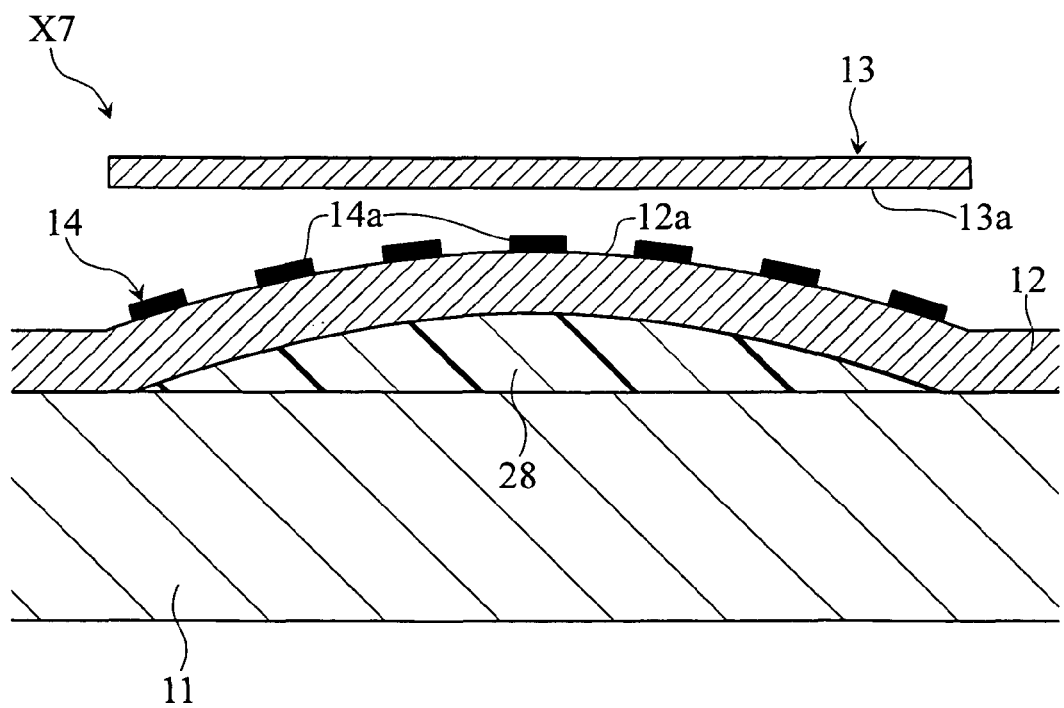
FIG. 22 is a fragmentary cross-sectional view showing a variable capacitor according to a seventh embodiment of the present invention.

FIG. 22 is a fragmentary cross-sectional view showing a variable capacitor X7 according to a seventh embodiment of the present invention. FIG. 22 corresponds to FIG. 4, in showing the portion of the relevant variable capacitor. The variable capacitor X7 includes the substrate 11, the fixed electrode 12 of a curved shape, the movable electrode 13 without a curved portion, the dielectric pattern 14, and a mound portion 28. The variable capacitor X7 is different from the variable capacitor X1 in including the mound portion 28 and in that the fixed electrode 12 is of a curved shape and the movable electrode 13 is not of a curved shape.

Figure 23:
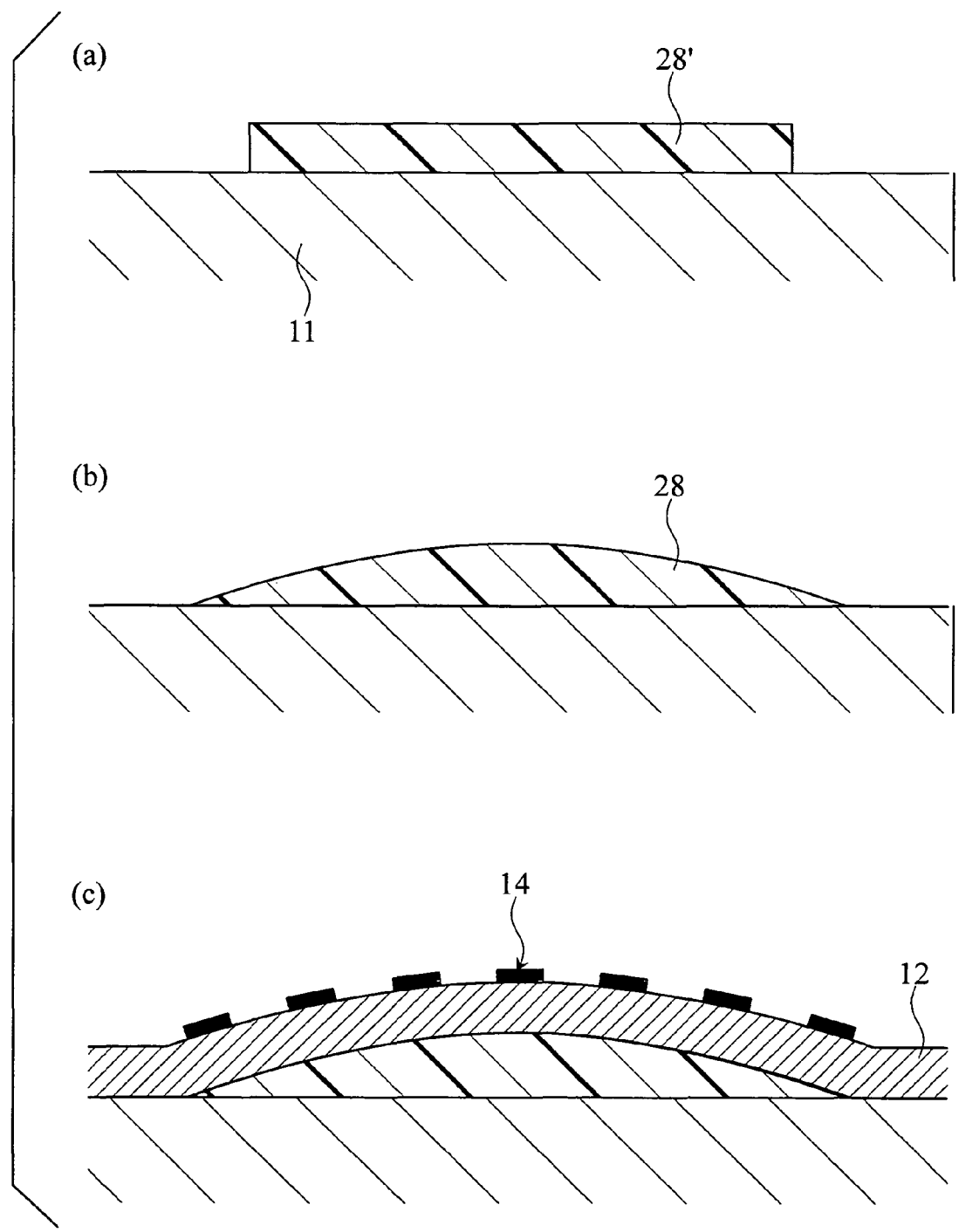
FIG. 23 sequentially shows steps of a manufacturing process of the variable capacitor shown in FIG. 22.
Figure 24:
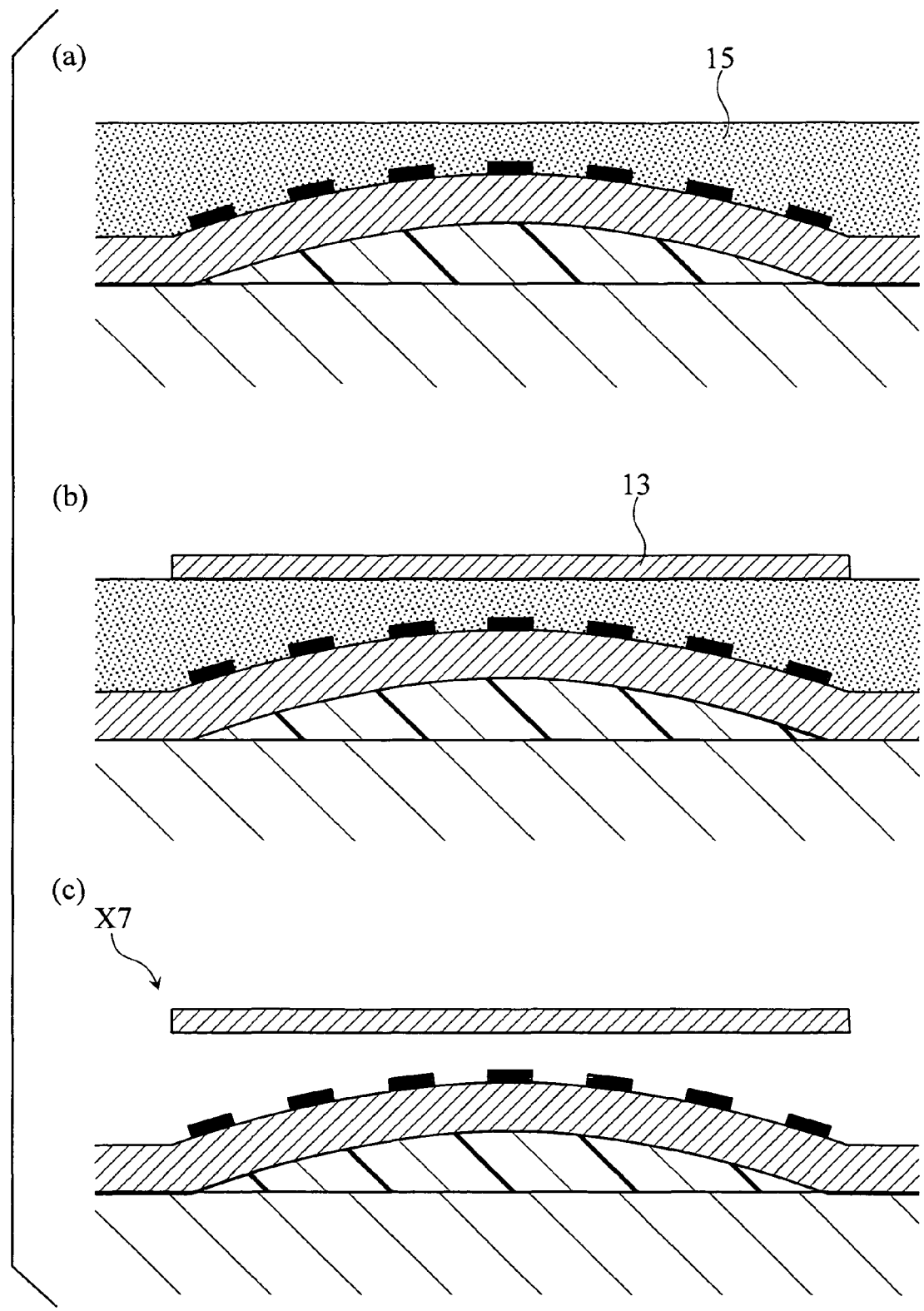
FIG. 24 shows, in section, steps subsequent to those of FIG. 23.

FIG. 23(a)-24(c) illustrate an example of a manufacturing process of the variable capacitor X7. To manufacture the variable capacitor X7, firstly a resist pattern 28' is formed on a predetermined position on the substrate 11, as shown in FIG. 23(a). Then a heat treatment is performed so as to deform the resist pattern 28' as shown in FIG. 23(b), to thereby form the mound portion 28. The fixed electrode 12 and the dielectric pattern 14 are then formed, as shown in FIG. 23(c). The forming process of these components is similar to that described referring to FIG. 6(a)-(b). Then the sacrifice layer 15 is formed as shown in FIG. 24(a), after which the movable electrode 13 is formed as shown in FIG. 24(b). The forming process of these components is similar to that described referring to FIGS. 6(c) and 7(a). Finally, for example a wet etching process is performed to remove the sacrifice layer 15, as shown in FIG. 24(c). Through such process, the variable capacitor X7 including the fixed electrode 12 of a curved shape can be obtained.

Figure 25:
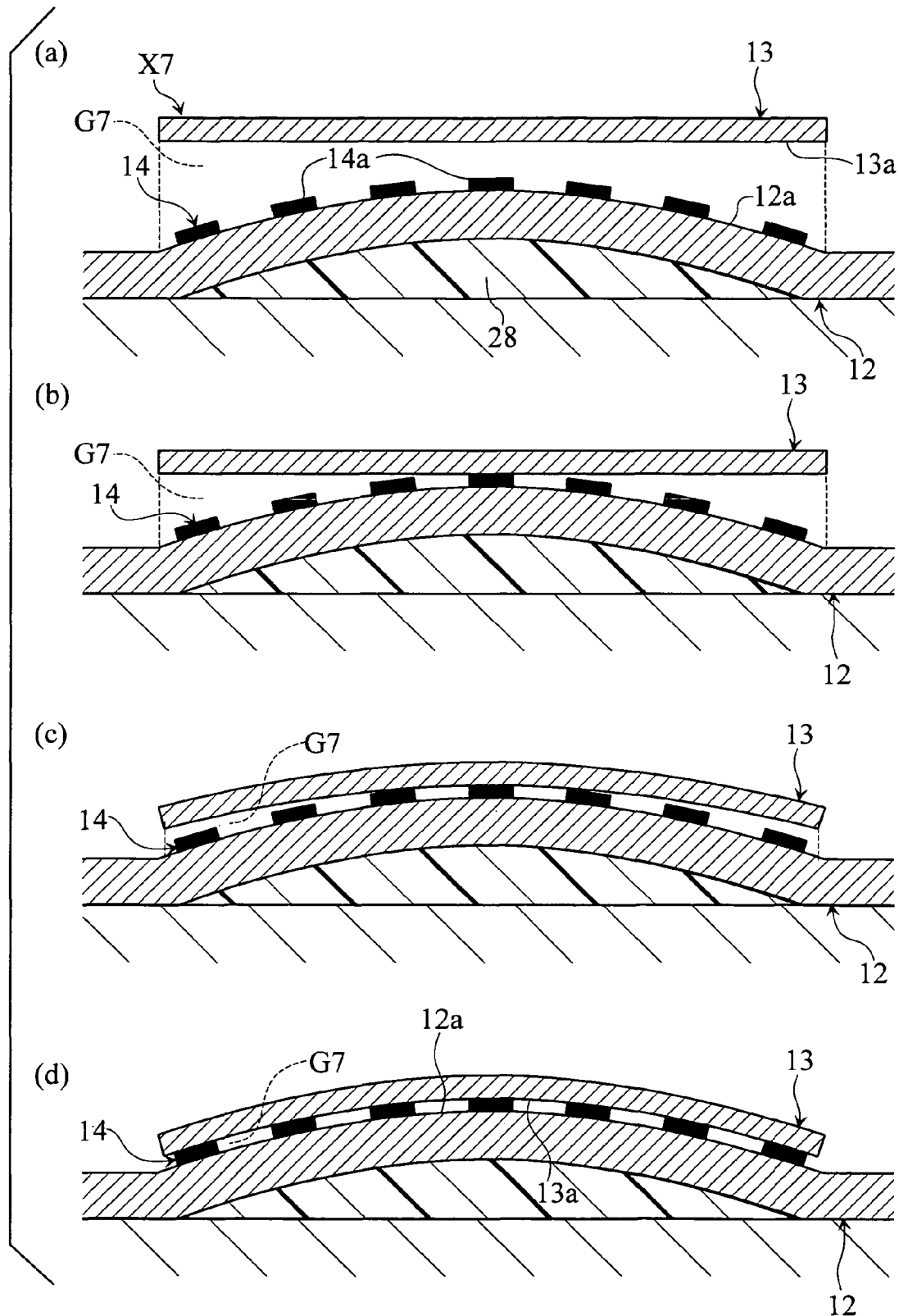
FIG. 25 sequentially shows a driving mode of the variable capacitor shown in FIG. 22.

The variable capacitor X7 may be driven in a similar manner to that described regarding the variable capacitor X1. Specifically, the variable capacitor X7 can continuously change, over an extensive range, the volume of the gap G7 between the fixed electrode 12 and the movable electrode 13, between the first state where the gap G7 is largest (initial state as shown in FIG. 25(a)) and the second state where the gap G7 is smallest as shown in FIG. 25(d). The variable capacitor X7 is, therefore, capable of achieving a large variation amount, or variation ratio, of the static capacitance, like the variable capacitor X1.

In the variable capacitor X7, the total length of the outline of the dielectric pattern 14 formed in a predetermined pattern on the opposing face 12a of the fixed electrode 12 is relatively long, as in the variable capacitor X1 (in other words, the length per unit area of the dielectric pattern 14 based on the overall length of the outline of the dielectric pattern 14 is relatively long). Accordingly, the charge can readily immigrate from the dielectric pattern 14 to the opposing face 12a, and hence the dielectric pattern 14 is prevented from being charged by the so-called charge transfer. In the variable capacitor X7, therefore, the minimum driving voltage can be prevented from fluctuating, for the same reason as described regarding the variable capacitor X1.

In the variable capacitor X7, the dielectric pattern 14 shown in FIG. 9 may be provided on the opposing face 13a of the movable electrode 13, instead of on the opposing face 12a of the fixed electrode 12, as stated regarding the variable capacitor X1. In the variable capacitor X7, the dielectric pattern 14' shown in FIG. 10 may be provided on the opposing face 13a of the movable electrode 13, in addition to the dielectric pattern 14 provided on the opposing face 12a of the fixed electrode 12, as stated regarding the variable capacitor X1. In the variable capacitor X7, the conductor layer 17 shown in FIG. 11 may be provided on the dielectric pattern 14, as stated regarding the variable capacitor X1.

In the variable capacitor X7, the dielectric film 21 described regarding the variable capacitor X2 shown in FIG. 12(a)-(b) may be provided on one of the opposing face 12a of the fixed electrode 12 and the opposing face 13a of the movable electrode 13, and the conductor pattern 22 described regarding the variable capacitor X2 may be provided on the other of the opposing face 12a and the opposing face 13a, instead of providing the dielectric pattern 14. In the variable capacitor X7, the dielectric film 21 and the conductor pattern 23 provided thereon, described regarding the variable capacitor X3 shown in FIG. 14(a)-(b), may be provided on one of the opposing face 12a and the opposing face 13a, instead of providing the dielectric pattern 14. In the variable capacitor X7, the dielectric film 24 and the conductor pattern 25 described regarding the variable capacitor X4 shown in FIG. 16(a)-(b) may be provided on one of the opposing face 12a and the opposing face 13a, instead of providing the dielectric pattern 14. In the variable capacitor X7, the dielectric film 24 and the conductor pattern 25 described regarding the variable capacitor X5 shown in FIG. 18(a)-(b) may be provided on one of the opposing face 12a and the opposing face 13a, and the conductor pattern 26 described regarding the variable capacitor X5 may be provided on the other of the opposing face 12a and the opposing face 13a, instead of providing the dielectric pattern 14. In the variable capacitor X7, the dielectric film 24 and the conductor pattern 25 described regarding the variable capacitor X6 shown in FIG. 20(a)-(b) may be provided on one of the opposing face 12a and the opposing face 13a, and the conductor pattern 27 described regarding the variable capacitor X6 may be provided on the other of the opposing face 12a and the opposing face 13a, instead of providing the dielectric pattern 14.

Figure 26:
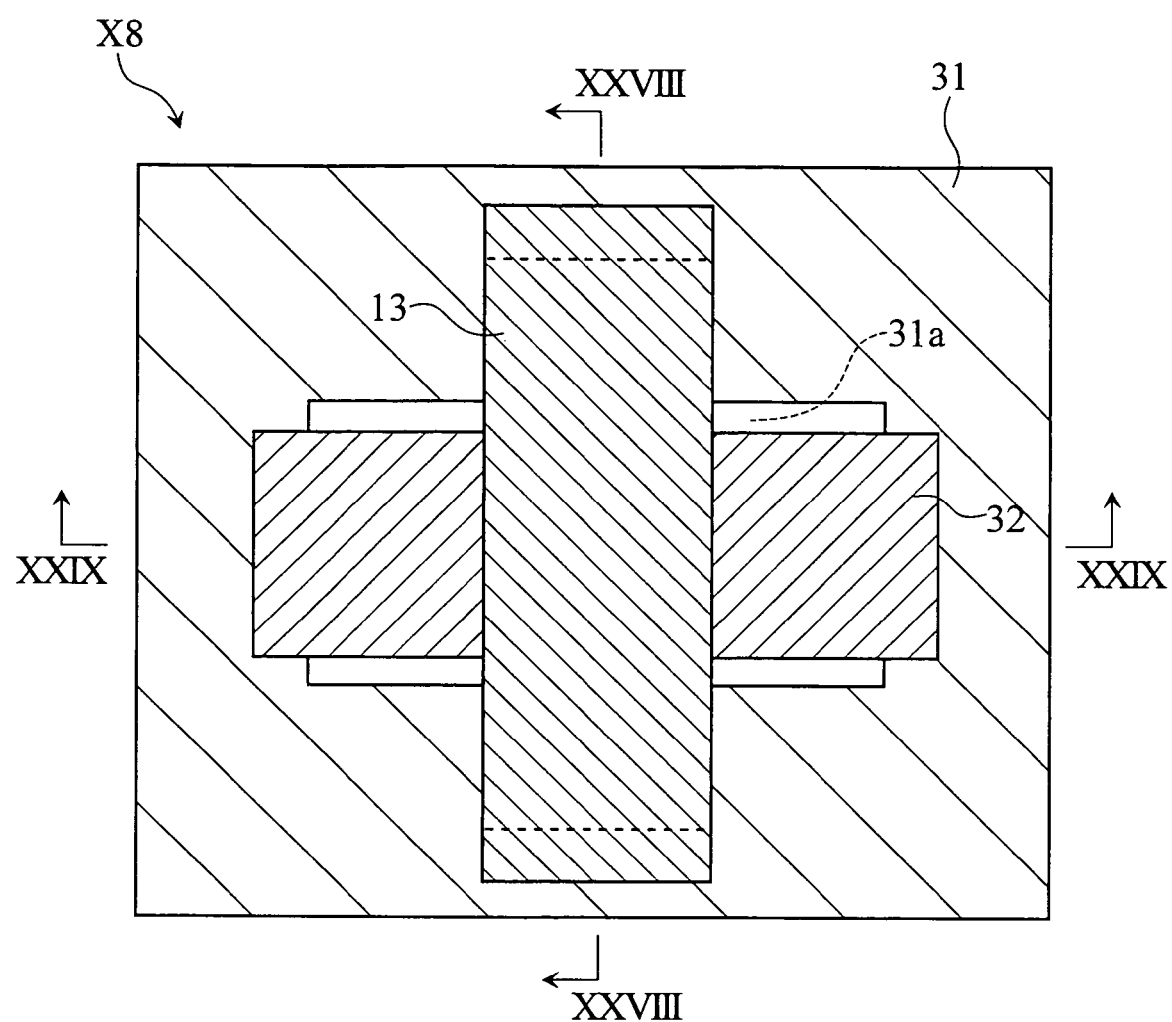
FIG. 26 is a plan view showing a variable capacitor according to an eighth embodiment of the present invention.
Figure 27:
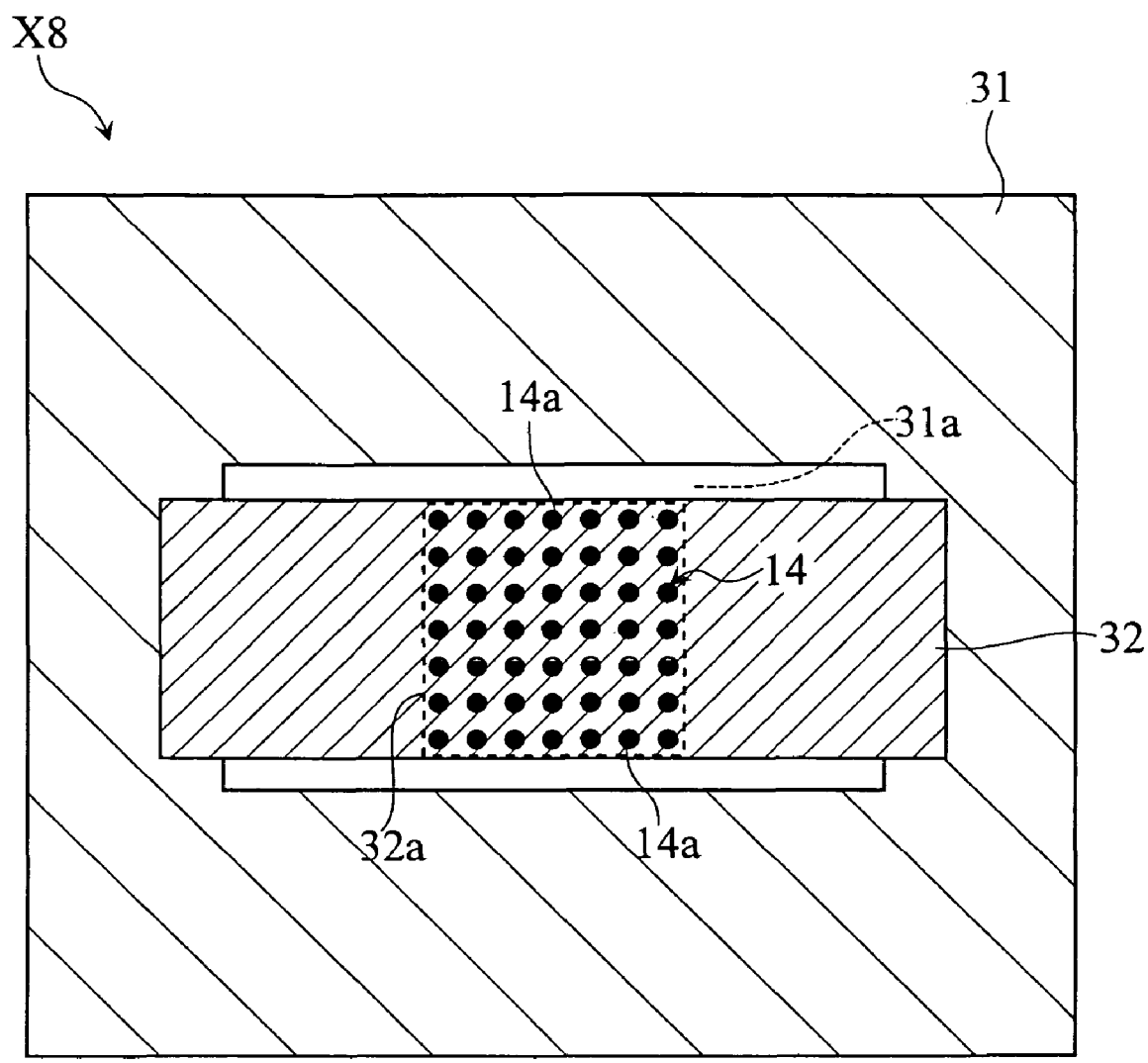
FIG. 27 is a fragmentary plan view showing the variable capacitor according to the eighth embodiment.
Figure 28:
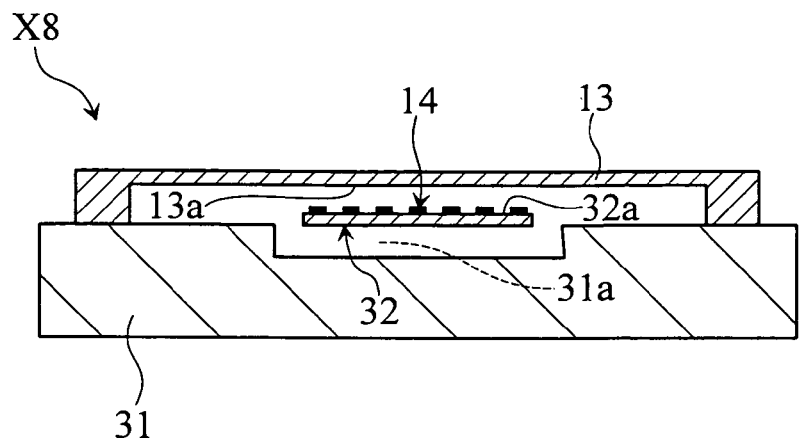
FIG. 28 is a cross-sectional view taken along the line XXVIII-XXVIII in FIG. 26.
Figure 29:
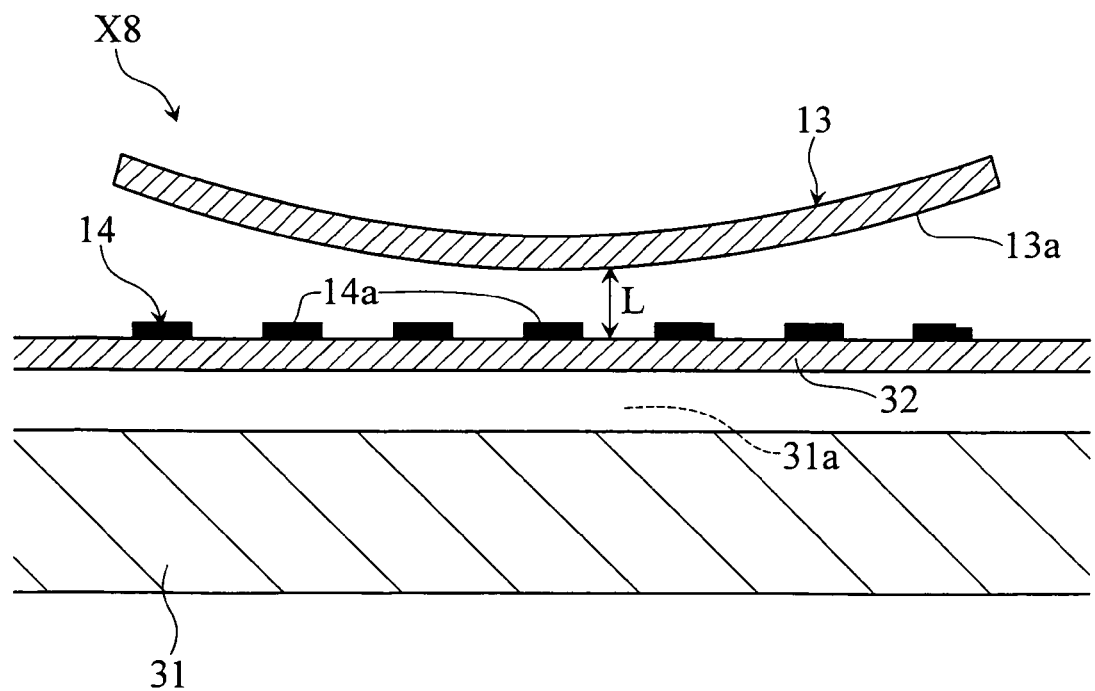
FIG. 29 is an enlarged fragmentary cross-sectional view taken along the line XXIX-XXIX in FIG. 26.

FIGS. 26 to 29 depict a variable capacitor X8 according to an eighth embodiment of the present invention. FIG. 26 is a plan view showing the variable capacitor X8. FIG. 27 is a fragmentary plan view showing the variable capacitor X8. FIG. 28 is a cross-sectional view taken along the line XXVIII-XXVIII in FIG. 26. FIG. 29 is an enlarged fragmentary cross-sectional view taken along the line XXIX-XXIX in FIG. 26.

The variable capacitor X8 includes a substrate 31, a movable electrode 32, the movable electrode 13 (not shown in FIG. 27), and the dielectric pattern 14. The variable capacitor X8 is different from the variable capacitor X1 in including the substrate 31 and the movable electrode 32, in place of the substrate 11 and the fixed electrode 12.

The substrate 31 includes a recessed portion 31a, and is made of, for example, a silicon material. On the substrate 31, a predetermined interconnect pattern (not shown) is provided for electrical connection with the movable electrode 32 or the movable electrode 13.

The movable electrode 32 has the both ends connected to the substrate 31 and is disposed so as to extend over the recessed portion 31a, and constitutes a part of a pair of capacitor electrodes provided in the variable capacitor X8. The movable electrode 13 is erected on the substrate 31 as shown in FIG. 28, and constitutes the other part of the pair of capacitor electrodes in the variable capacitor X8. As is apparent from FIG. 26, the movable electrode 32 and the movable electrode 13 are oriented so as to intersect each other and to partially oppose each other, such that the movable electrode 32 includes an opposing face 32a opposing the movable electrode 13, and the movable electrode 13 includes the opposing face 13a opposing the movable electrode 32. The area of the opposing portion of the movable electrode 32 or opposing face 12a and the movable electrode 13 or opposing face 13a is, for example, 10000 to 40000 μm². The portion of the movable electrode 13 opposing the movable electrode 32 is of a curved shape protruding toward the movable electrode 32 as shown in FIG. 29. The distance L shown in FIG. 29 between the movable electrode 32 and the movable electrode 13 is, for example, 0.5 to 2 μm. The movable electrode 32 has a thickness of, for example, 1 to 2 μm. Preferably, one of the movable electrode 32 and the movable electrode 13 may be grounded. The movable electrode 32 and the movable electrode 13 thus configured are constituted of a conductive material, such as aluminum (Al) or copper (Cu).

Figure 30:
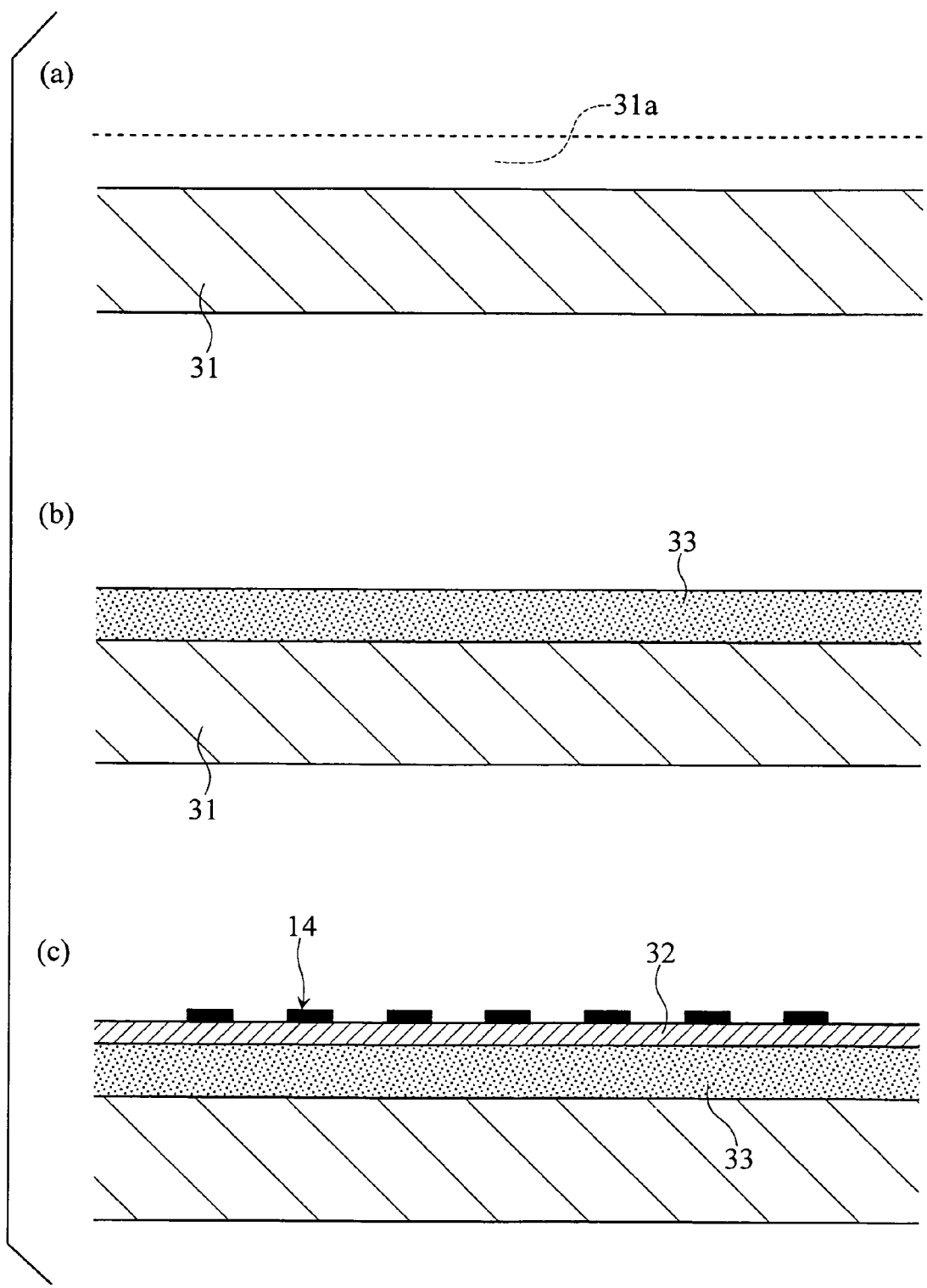
FIG. 30 sequentially shows steps of a manufacturing process of the variable capacitor shown in FIG. 29.

FIG. 30(a)-(c) is a cross-sectional view corresponding to FIG. 29, representing an example of a manufacturing process of the variable capacitor X8. To manufacture the variable capacitor X8, firstly the substrate 31 including the recessed portion 31a is prepared, as shown in FIG. 30(a). For example, an anisotropic etching process may be performed on a predetermined silicon substrate, utilizing a predetermined resist pattern as the mask, to thereby from the substrate 31 which includes the recessed portion 31a. A reactive ion etching (RIE) is an example of the anisotropic etching process.

Referring then to FIG. 30(b), a sacrifice material 33 is loaded in the recessed portion 31a of the substrate 31. More specifically, for example a sputtering process may be performed to deposit a more than sufficient amount of sacrifice material 33 in the recessed portion 31a and on the substrate 31, after which the excessive portion of the sacrifice material 33 deposited on the substrate 31 is ground off. A photoresist may be employed as the sacrifice material 33.

Then as shown in FIG. 30(c), the movable electrode 32 and the dielectric pattern 14 are formed. The formation process of the movable electrode 32 and the dielectric pattern 14 may be similar to that for the fixed electrode 12 and the dielectric pattern 14 described referring to FIG. 6(a)-(b).

Figure 31:
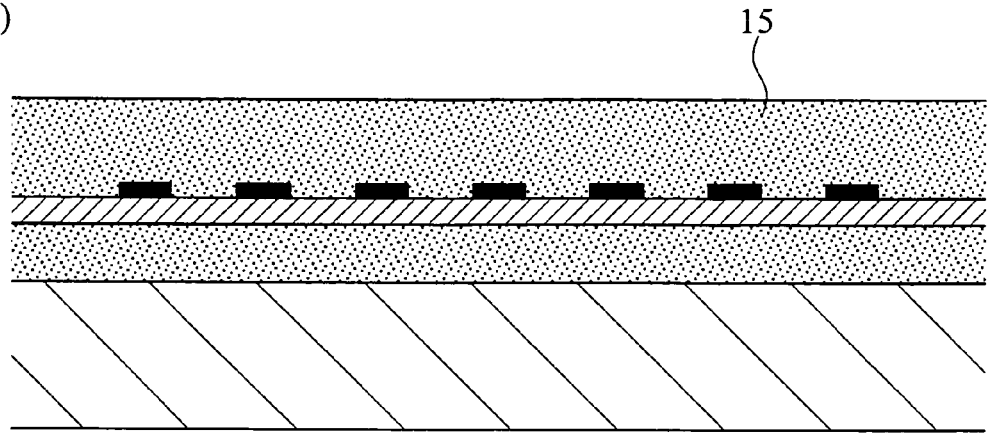
FIG. 31 shows steps of a process subsequent to those of FIG. 30.
Figure 31:
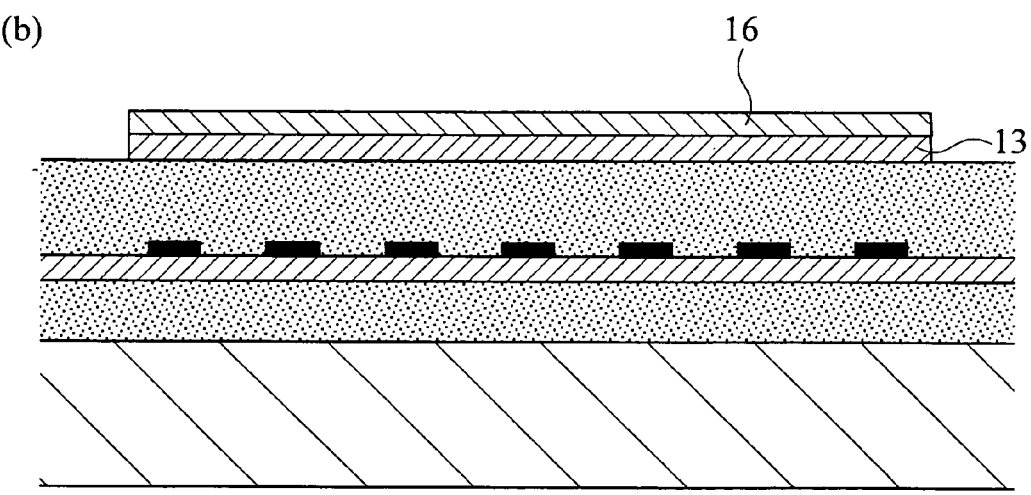
Figure 31:
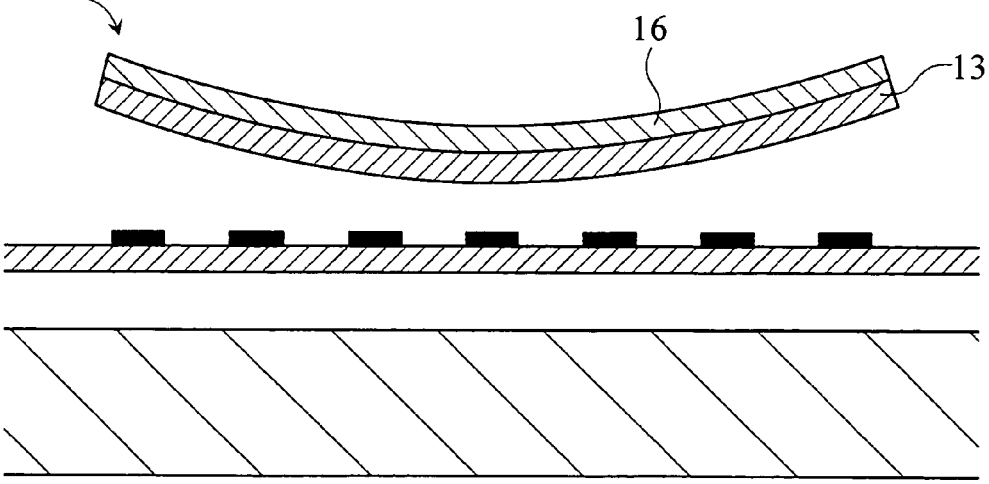

Proceeding to FIG. 31(a), the sacrifice layer 15 and the movable electrode 13 are formed. The formation process of these components may be similar to that described referring to FIGS. 6(c) and 7(a).

Now as shown in FIG. 31(b), the material layer 16 is formed on the movable electrode 13. The material layer 16 serves to achieve the curved shape of the movable electrode 13, and is constituted of a material having a higher thermal expansion coefficient than the material of the movable electrode 13. Specific formation process of the material layer 16 is as described referring to FIG. 7(b). Upon decreasing the temperature after the foregoing process, the material layer 16 obtains therein greater shrinking force than in the movable electrode 13.

Finally, as shown in FIG. 31(c), for example a wet etching process is performed so as to remove the sacrifice layer 15 and the sacrifice material 33. Upon removing the sacrifice layer 15 and the sacrifice material 33, the material layer 16 shrinks by a larger extent than the movable electrode 13, thereby partially bending the movable electrode 13. Through the foregoing process for example, the variable capacitor X8 can be manufactured. The material layer 16, which is an example of methods for bending the movable electrode 13, is not shown in FIG. 26 and some of other drawings.

Figure 32:
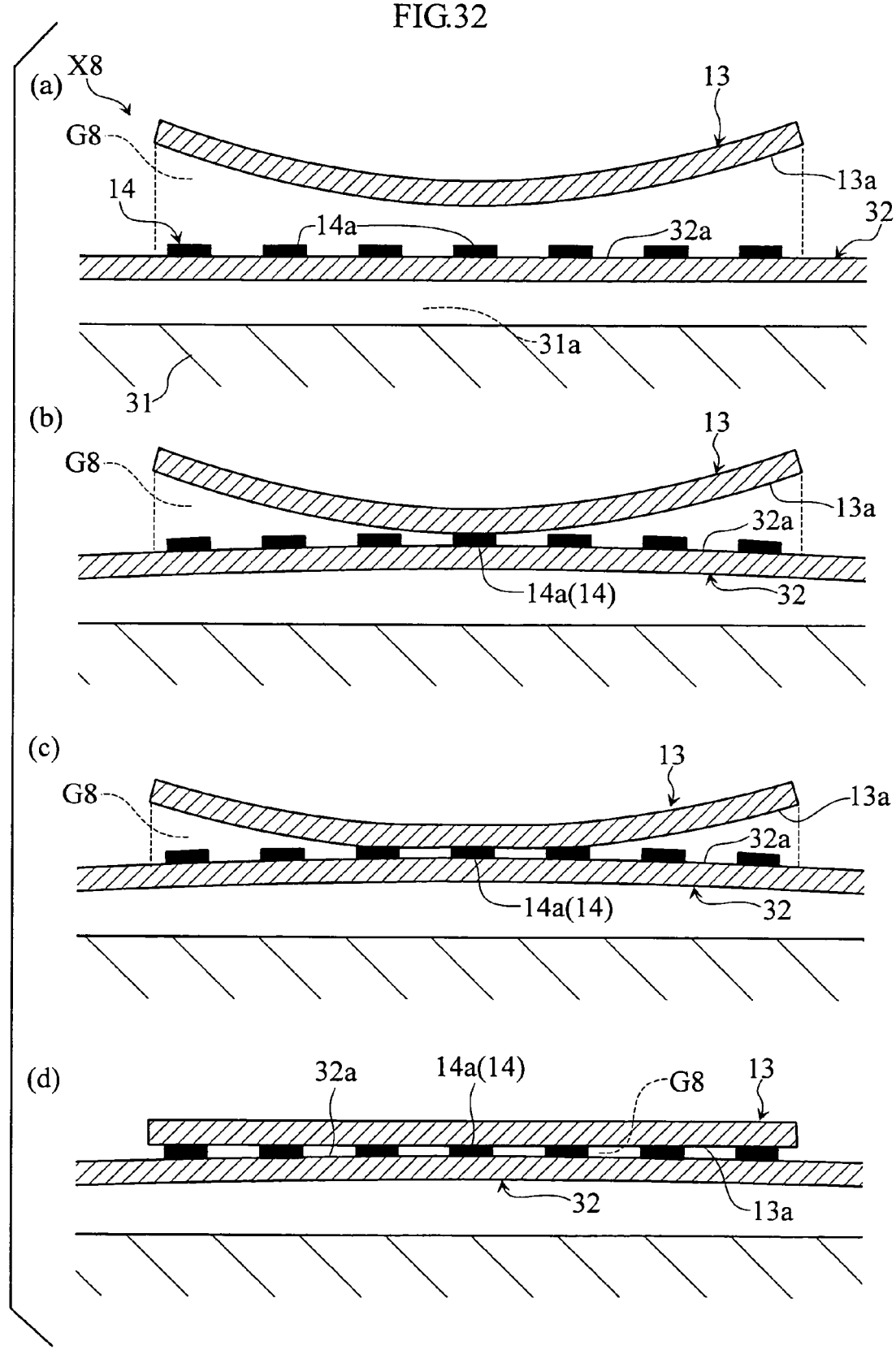
FIG. 32 sequentially shows a driving mode of the variable capacitor shown in FIG. 26.

The variable capacitor X8 may be driven in a similar manner to that described regarding the variable capacitor X1. Specifically, the variable capacitor X8 can continuously change, over an extensive range, the volume of the gap G8 between the movable electrode 32 and the movable electrode 13, between the first state where the gap G8 is largest (initial state as shown in FIG. 32(a)) and the second state where the gap G8 is smallest as shown in FIG. 32(d). The variable capacitor XB is, therefore, capable of achieving a large variation amount, or variation ratio, of the static capacitance, like the variable capacitor X1.

In the variable capacitor X8, the total length of the outline of the dielectric pattern 14 formed in a predetermined pattern on the opposing face 32a of the movable electrode 32 is relatively long (in other words, the length per unit area of the dielectric pattern 14 based on the overall length of the outline of the dielectric pattern 14 is relatively long). Accordingly, the charge can readily immigrate from the dielectric pattern 14 to the opposing face 32a, and hence the dielectric pattern 14 is prevented from being charged by the so-called charge transfer. In the variable capacitor X8, therefore, the minimum driving voltage can be prevented from fluctuating, for the same reason as described regarding the variable capacitor X1.

Figure 33:
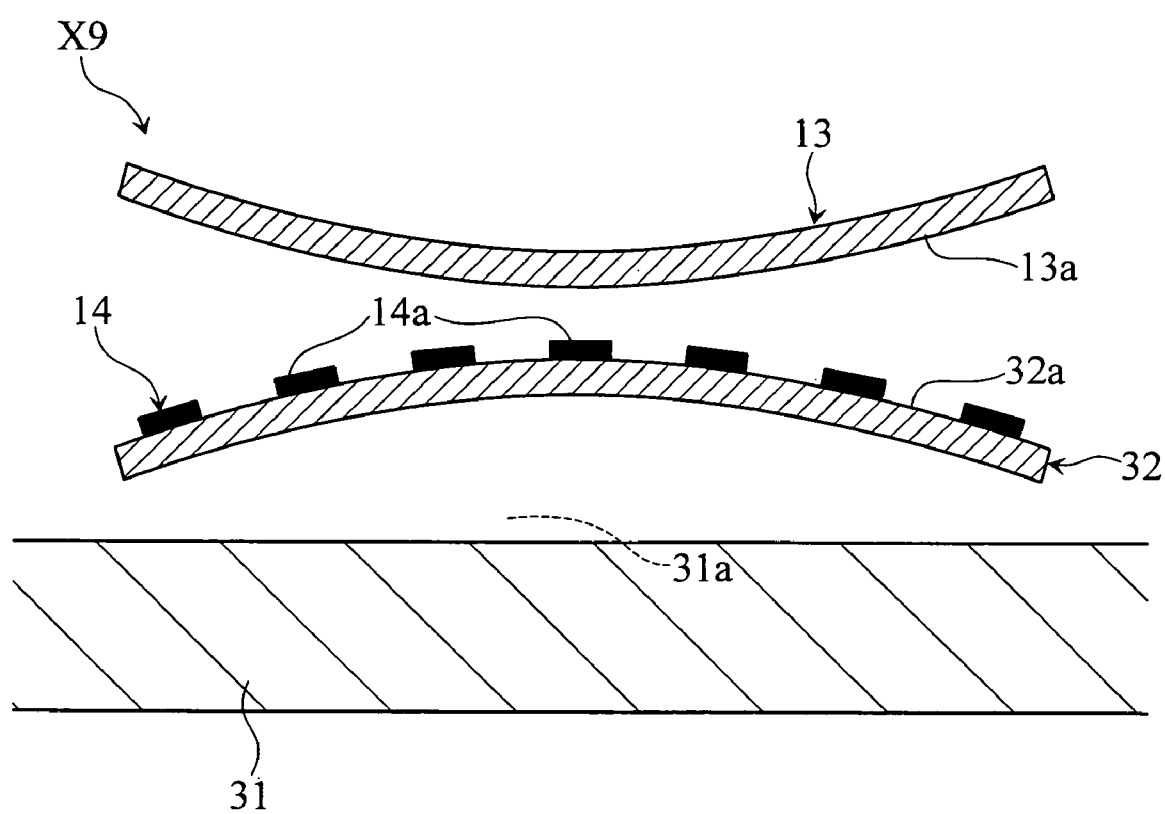
FIG. 33 is a fragmentary cross-sectional view showing a variable capacitor according to a ninth embodiment of the present invention.

FIG. 33 is a fragmentary cross-sectional view showing a variable capacitor according to a ninth embodiment of the present invention. FIG. 33 corresponds to FIG. 29, in showing the portion of the relevant variable capacitor. The variable capacitor X9 includes the substrate 31, the movable electrode 32 of a curved shape, the movable electrode 13 of a curved shape, and the dielectric pattern 14. The variable capacitor X9 is different from the variable capacitor X8 in that the movable electrode 32 is of a curved shape. The movable electrode 32 of a curved shape may be formed through a similar process to the formation of the fixed electrode 12 of a curved shape in the manufacturing process of the variable capacitor X7.

Figure 34:
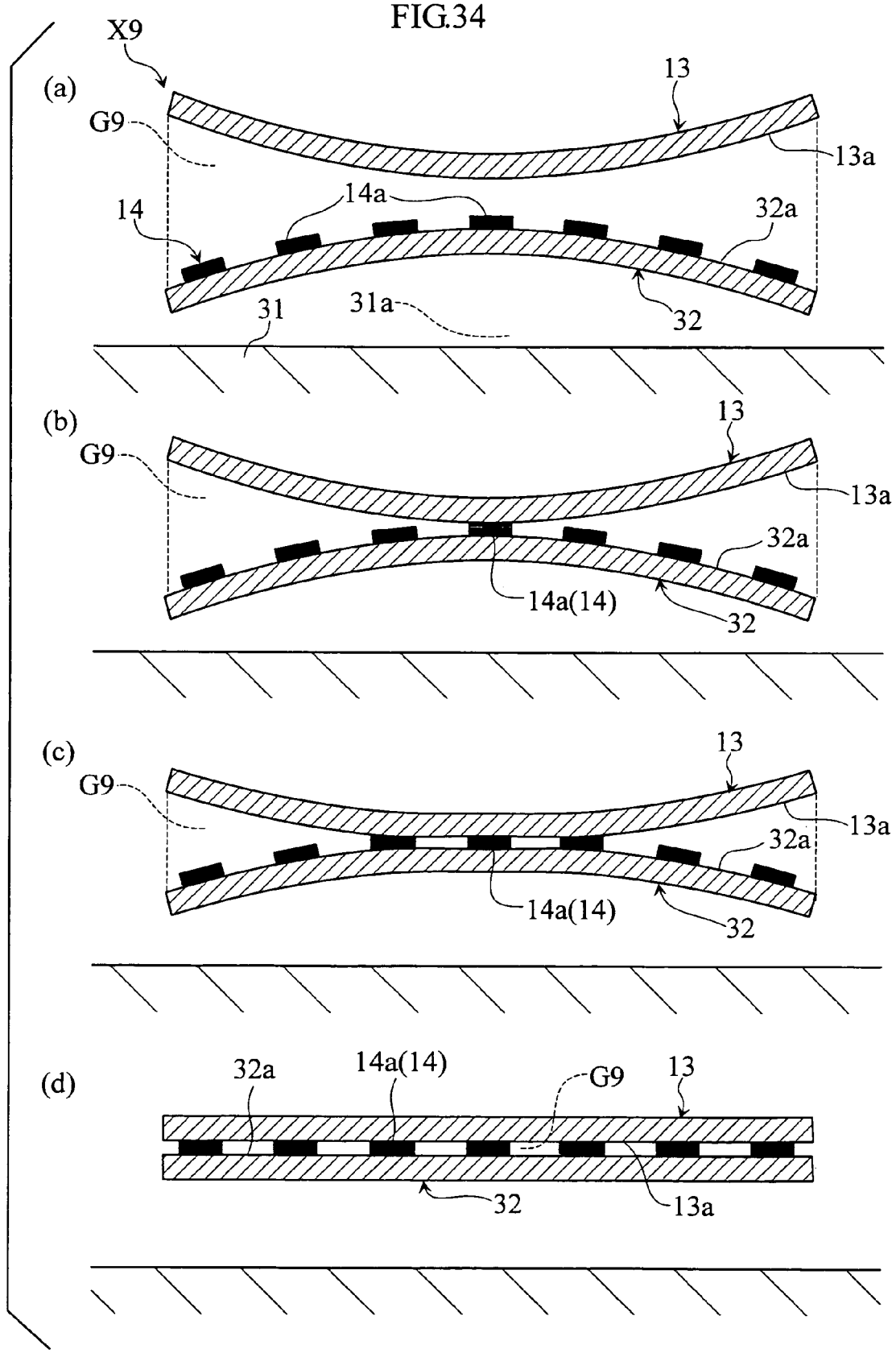
FIG. 34 sequentially shows a driving mode of the variable capacitor shown in FIG. 33.

The variable capacitor X9 may be driven in a similar manner to that described regarding the variable capacitor X1. Specifically, the variable capacitor X9 can continuously change, over an extensive range, the volume of the gap G9 between the movable electrode 32 and the movable electrode 13, between the first state where the gap G9 is largest (initial state as shown in FIG. 34(a)) and the second state where the gap G9 is smallest as shown in FIG. 34(d). The variable capacitor X9 is, therefore, capable of achieving a large variation amount, or variation ratio, of the static capacitance, like the variable capacitor X1.

In the variable capacitor X9, the total length of the outline of the dielectric pattern 14 formed in a predetermined pattern on the opposing face 32a of the movable electrode 32 is relatively long (in other words, the length per unit area of the dielectric pattern 14 based on the overall length of the outline of the dielectric pattern 14 is relatively long). Accordingly, the charge can readily immigrate from the dielectric pattern 14 to the opposing face 32a, and hence the dielectric pattern 14 is prevented from being charged by the so-called charge transfer. In the variable capacitor X9, therefore, the minimum driving voltage can be prevented from fluctuating, for the same reason as described regarding the variable capacitor X1.

Figure 35:
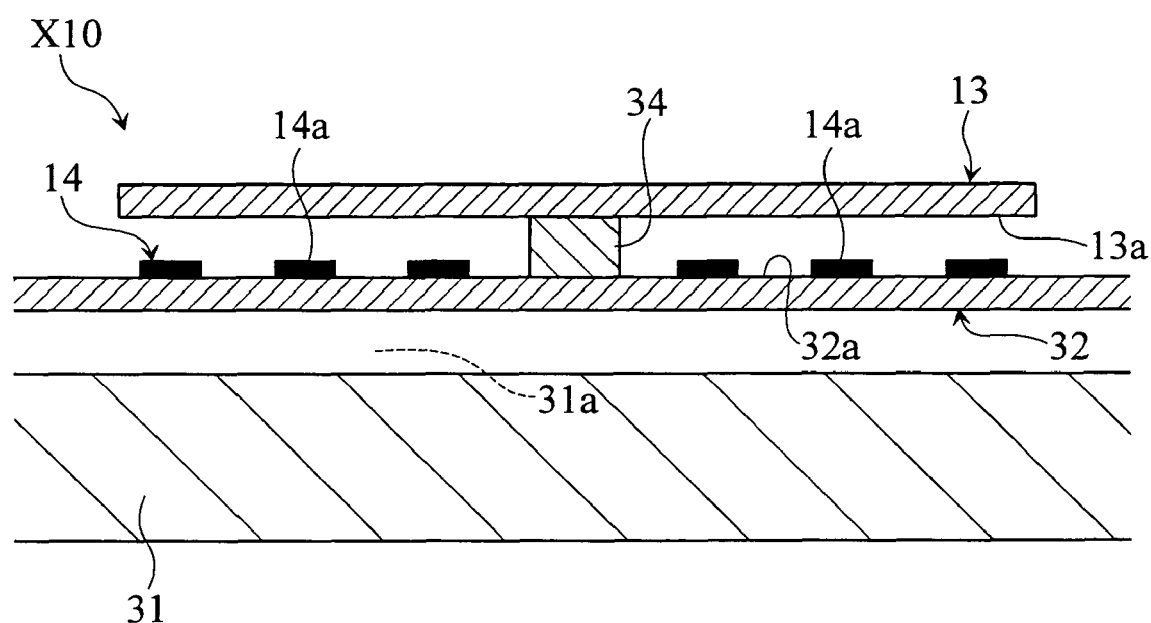
FIG. 35 is a fragmentary cross-sectional view showing a variable capacitor according to a tenth embodiment of the present invention.

FIG. 35 is a fragmentary cross-sectional view showing a variable capacitor x10 according to a tenth embodiment of the present invention. FIG. 35 corresponds to FIG. 29, in showing the portion of the relevant variable capacitor. The variable capacitor X10 includes the substrate 31, the movable electrode 32 without a curved portion, the movable electrode 13 without a curved portion, the dielectric pattern 14, and an anchor portion 34. The variable capacitor X10 is different from the variable capacitor X8 in that the movable electrode 13 is not of a curved shape, and in including the anchor portion 34. The movable electrode 32 of a curved shape may be formed through a similar process to the formation of the fixed electrode 12 of a curved shape in the manufacturing process of the variable capacitor X7.

The variable capacitor X10 may be manufactured through a similar process to that described referring to FIG. 30(a)-(c), except for burying the anchor portion 34 in the sacrifice layer 15 and skipping the formation of the material layer 16 on the movable electrode 13.

Figure 36:
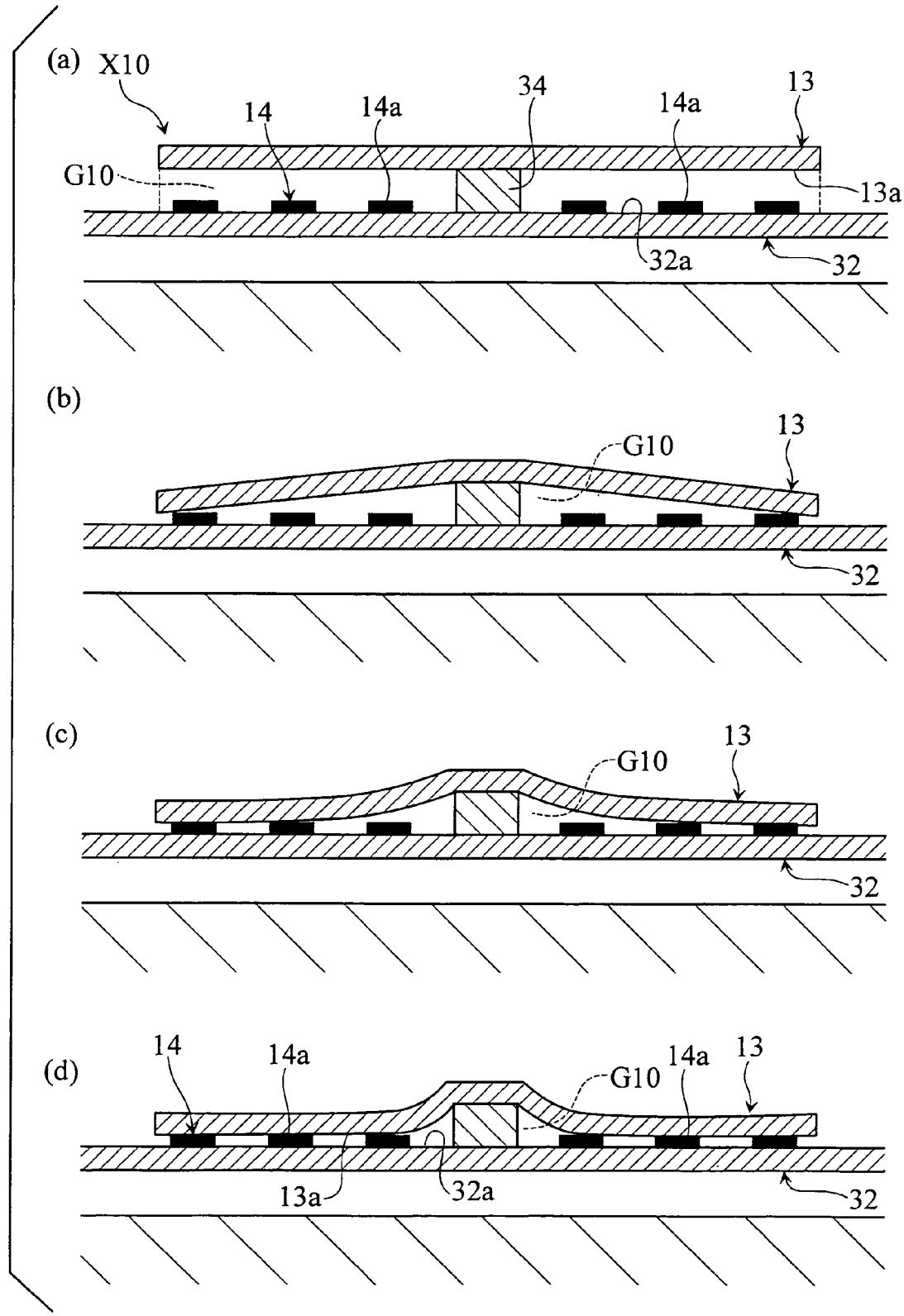
FIG. 36 sequentially shows a driving mode of the variable capacitor shown in FIG. 35.

The variable capacitor X10 may be driven in a similar manner to that described regarding the variable capacitor X1. Specifically, the variable capacitor X10 can continuously change, over an extensive range, the volume of the gap G10 between the movable electrode 32 and the movable electrode 13, between the first state where the gap G10 is largest (initial state as shown in FIG. 36(a)) and the second state where the gap G10 is smallest as shown in FIG. 36(d). The variable capacitor X10 is, therefore, capable of achieving a large variation amount, or variation ratio, of the static capacitance, like the variable capacitor X1.

In the variable capacitor X10, the total length of the outline of the dielectric pattern 14 formed in a predetermined pattern on the opposing face 32a of the movable electrode 32 is relatively long (in other words, the length per unit area of the dielectric pattern 14 based on the overall length of the outline of the dielectric pattern 14 is relatively long). Accordingly, the charge can readily immigrate from the dielectric pattern 14 to the opposing face 32a, and hence the dielectric pattern 14 is prevented from being charged by the so-called charge transfer. In the variable capacitor X10, therefore, the minimum driving voltage can be prevented from fluctuating, for the same reason as described regarding the variable capacitor X1.

The variable capacitor X1, X2 may also include an anchor portion that connects the electrodes, as the anchor portion 34 in the variable capacitor X10.

In the variable capacitor X8 to X10, the dielectric pattern 14 shown in FIG. 9 may be provided on the opposing face 13a of the movable electrode 13, instead of on the opposing face 32a of the movable electrode 32, as stated regarding the variable capacitor X1. In the variable capacitor X8 to X10, the dielectric pattern 14' shown in FIG. 10 may be provided on the opposing face 13a of the movable electrode 13, in addition to the dielectric pattern 14 provided on the opposing face 32a of the movable electrode 32, as stated regarding the variable capacitor X1. In the variable capacitor X8 to X10, the conductor layer 17 shown in FIG. 11 may be provided on the dielectric pattern 14, as stated regarding the variable capacitor X1.

In the variable capacitor X8 to X10, the dielectric film 21 described regarding the variable capacitor X2 shown in FIG. 12(a)-(b) may be provided on one of the opposing face 32a of the movable electrode 32 and the opposing face 13a of the movable electrode 13, and the conductor pattern 22 described regarding the variable capacitor X2 may be provided on the other of the opposing face 32a and the opposing face 13a, instead of providing the dielectric pattern 14. In the variable capacitor X8 to X10, the dielectric film 21 and the conductor pattern 23 provided thereon, described regarding the variable capacitor X3 shown in FIG. 14(a)-(b), may be provided on one of the opposing face 32a and the opposing face 13a, instead of providing the dielectric pattern 14. In the variable capacitor X8 to X10, the dielectric film 24 and the conductor pattern 25 described regarding the variable capacitor X4 shown in FIG. 16(a)-(b) may be provided on one of the opposing face 32a and the opposing face 13a, instead of providing the dielectric pattern 14. In the variable capacitor X8 to X10, the dielectric film 24 and the conductor pattern 25 described regarding the variable capacitor X5 shown in FIG. 18(a)-(b) may be provided on one of the opposing face 32a and the opposing face 13a, and the conductor pattern 26 described regarding the variable capacitor X5 may be provided on the other of the opposing face 32a and the opposing face 13a, instead of providing the dielectric pattern 14. In the variable capacitor X8 to X10, the dielectric film 24 and the conductor pattern 25 described regarding the variable capacitor X6 shown in FIG. 20(a)-(b) may be provided on one of the opposing face 32a and the opposing face 13a, and the conductor pattern 27 described regarding the variable capacitor X6 may be provided on the other of the opposing face 32a and the opposing face 13a, instead of providing the dielectric pattern 14.

The fixed electrode 12, the movable electrode 13, and the movable electrode 32 may have a different curved shape from the respective drawings. For example, the fixed electrode 12 in the variable capacitor X1 to X7 may include, in a region thereof opposing the movable electrode 13, a plurality of curved portions protruding toward the movable electrode 13, or at least a curved portion protruding in the opposite direction to the movable electrode 13. The movable electrode 13 in the variable capacitor X1 to X7 may include, in a region thereof opposing the fixed electrode 12, a plurality of curved portions protruding toward the fixed electrode 12, or at least a curved portion protruding in the opposite direction to the fixed electrode 12. The movable electrode 13 in the variable capacitor X8 to X10 may include, in a region thereof opposing the movable electrode 32, a plurality of curved portions protruding toward the movable electrode 32, or at least a curved portion protruding in the opposite direction to the movable electrode 32. The movable electrode 32 in the variable capacitor X8 to X10 may include, in a region thereof opposing the movable electrode 13, a plurality of curved portions protruding toward the movable electrode 13, or at least a curved portion protruding in the opposite direction to the movable electrode 13.

In summary of the foregoing, the above-described structures will be listed below as appendices.

[Appendix 1] A variable capacitor comprising: a capacitor electrode having a first opposing face; a movable capacitor electrode film having a second opposing face opposing the first opposing face and a curved portion protruding toward the capacitor electrode; and a first dielectric pattern provided on one of the first opposing face and the second opposing face.

[Appendix 2] A variable capacitor comprising: a capacitor electrode having a first opposing face; a movable capacitor electrode film having a second opposing face opposing the first opposing face; an anchor portion that partially fixes the movable capacitor electrode film to the capacitor electrode; and a dielectric pattern provided on one of the first opposing face and the second opposing face.

[Appendix 3] The variable capacitor according to appendix 1 or 2, further comprising a conductor layer provided on the first dielectric pattern.

[Appendix 4] The variable capacitor according to appendix 1 or 2, further comprising a second dielectric pattern provided on one of the first opposing face and the second opposing face on which the first dielectric pattern is not provided.

[Appendix 5] The variable capacitor according to any one of appendices 1 to 4, wherein C-V characteristic is adjusted by controlling at least one of shape and density of the dielectric pattern.

[Appendix 6] The variable capacitor according to appendix 5, wherein the dielectric pattern includes a portion where pattern density is not uniform.

[Appendix 7] The variable capacitor according to any one of appendices 1 to 6, wherein the dielectric pattern includes a plurality of dielectric islands.

[Appendix 8] A variable capacitor comprising: a capacitor electrode having a first opposing face; a movable capacitor electrode film having a second opposing face opposing the first opposing face and a curved portion protruding toward the capacitor electrode; a dielectric film provided on one of the first opposing face and the second opposing face; and a conductor pattern provided on the other of the first opposing face and the second opposing face.

[Appendix 9] A variable capacitor comprising: a capacitor electrode having a first opposing face; a movable capacitor electrode film having a second opposing face opposing the first opposing face; a dielectric film provided on one of the first opposing face and the second opposing face; an anchor portion that partially fixes the movable capacitor electrode film to the capacitor electrode; and a conductor pattern provided on the other of the first opposing face and the second opposing face.

[Appendix 10] A variable capacitor comprising: a capacitor electrode having a first opposing face; a movable capacitor electrode film having a second opposing face opposing the first opposing face and a curved portion protruding toward the capacitor electrode or in an opposite direction of the capacitor electrode; a dielectric film provided on one of the first opposing face and the second opposing face; and a conductor pattern provided on the dielectric film.

[Appendix 11] A variable capacitor comprising: a capacitor electrode having a first opposing face; a movable capacitor electrode film having a second opposing face opposing the first opposing face; an anchor portion that partially fixes the movable capacitor electrode film to the capacitor electrode; a dielectric film provided on one of the first opposing face and the second opposing face; and a conductor pattern provided on the dielectric film.

[Appendix 12] A variable capacitor comprising: a capacitor electrode having a first opposing face; a movable capacitor electrode film having a second opposing face opposing the first opposing face and a curved portion protruding toward the capacitor electrode or in an opposite direction of the capacitor electrode; a dielectric film provided on one of the first opposing face and the second opposing face; and a conductor pattern buried in the dielectric film so as to be exposed toward the movable capacitor electrode film.

[Appendix 13] A variable capacitor comprising: a capacitor electrode having a first opposing face; a movable capacitor electrode film having a second opposing face opposing the first opposing face; an anchor portion that partially fixes the movable capacitor electrode film to the capacitor electrode; a dielectric film provided on one of the first opposing face and the second opposing face; and a conductor pattern buried in the dielectric film so as to be exposed toward the movable capacitor electrode film.

[Appendix 14] The variable capacitor according to appendix 12 or 13, wherein the conductor pattern is a conductor film having a plurality of openings.

[Appendix 15] The variable capacitor according to any one of appendices 12 to 14, wherein a surface of the dielectric film opposing the movable capacitor electrode film and a surface of the conductor pattern opposing the movable capacitor electrode film are flush with each other.

[Appendix 16] The variable capacitor according to any one of appendices 12 to 14, wherein a surface of the conductor pattern opposing the movable capacitor electrode film is recessed toward the capacitor electrode with respect to a surface of the dielectric film opposing the movable capacitor electrode film.

[Appendix 17] The variable capacitor according to any of appendices 12 to 14, wherein a surface of the dielectric film opposing the movable capacitor electrode film is recessed toward the capacitor electrode with respect to a surface of the conductor pattern opposing the movable capacitor electrode film.

[Appendix 18] The variable capacitor according to any of appendices 1, 8, 10, or 12, further comprising an anchor portion that partially connects between the capacitor electrode and the movable capacitor electrode film.

[Appendix 19] The variable capacitor according to any of appendices 1 to 18, wherein the capacitor electrode is a fixed electrode.

[Appendix 20] The variable capacitor according to any of appendix 19, wherein the first opposing face of the fixed electrode includes a curved portion protruding toward the movable capacitor electrode film.

[Appendix 21] The variable capacitor according to any of appendices 1 to 18, wherein the capacitor electrode is a movable capacitor electrode film.

[Appendix 22] The variable capacitor according to any of appendices 1 to 18, wherein the capacitor electrode is a movable capacitor electrode film including a curved portion protruding toward the movable capacitor electrode film.

[Appendix 23] A variable capacitor comprising: a movable capacitor electrode film having a first opposing face; a fixed capacitor electrode having a second opposing face opposing the first opposing face and a curved portion protruding toward the movable capacitor electrode film; and a dielectric pattern provided on one of the first opposing face and the second opposing face.

[Appendix 24] A variable capacitor comprising: a movable capacitor electrode film having a first opposing face; a fixed capacitor electrode having a second opposing face opposing the first opposing face and a curved portion protruding toward the movable capacitor electrode film; a dielectric film provided on one of the first opposing face and the second opposing face; and a conductor pattern provided on the other of the first opposing face and the second opposing face.

[Appendix 25] A variable capacitor comprising: a movable capacitor electrode film having a first opposing face; a fixed capacitor electrode having a second opposing face opposing the first opposing face and a curved portion protruding toward the movable capacitor electrode film; a dielectric film provided on one of the first opposing face and the second opposing face; and a conductor pattern provided on the dielectric film.

[Appendix 26] A variable capacitor comprising: a movable capacitor electrode film having a first opposing face; a fixed capacitor electrode having a second opposing face opposing the first opposing face and a curved portion protruding toward the movable capacitor electrode film; a dielectric film provided on one of the first opposing face and the second opposing face; and a conductor pattern buried in the dielectric film so as to be exposed toward the movable capacitor electrode film.

The invention claimed is:

1. A variable capacitor comprising:
a capacitor electrode including a first opposing face;
a movable capacitor electrode film including a second opposing face opposing the first opposing face, the film including a curved portion protruding, in an initial state where no voltage is applied between the capacitor electrode and the movable capacitor electrode film, toward the capacitor electrode or in an opposite direction of the capacitor electrode; and
a first dielectric pattern provided on one of the first opposing face and the second opposing face.

2. The variable capacitor according to claim 1, further comprising a conductor layer provided on the first dielectric pattern.

3. The variable capacitor according to claim 1, further comprising a second dielectric pattern provided on one of the first opposing face and the second opposing face on which the first dielectric pattern is not provided.

4. The variable capacitor according to claim 1, wherein C-V characteristic is adjusted by controlling at least one of shape and density of the dielectric pattern.

5. A variable capacitor comprising:
a capacitor electrode having a first opposing face;
a movable capacitor electrode film having a second opposing face opposing the first opposing face and a curved portion protruding, in an initial state where no voltage is applied between the capacitor electrode and the movable capacitor electrode film, toward the capacitor electrode or in an opposite direction of the capacitor electrode;
a dielectric film provided on one of the first opposing face and the second opposing face; and
a conductor pattern provided on the other of the first opposing face and the second opposing face.

6. A variable capacitor comprising:
a capacitor electrode having a first opposing face;
a movable capacitor electrode film having a second opposing face opposing the first opposing face and a curved portion protruding, in an initial state where no voltage is applied between the capacitor electrode and the movable capacitor electrode film, toward the capacitor electrode or in an opposite direction of the capacitor electrode;
a dielectric film provided on one of the first opposing face and the second opposing face; and
a conductor pattern provided on the dielectric film.

7. A variable capacitor comprising:
a capacitor electrode having a first opposing face;
a movable capacitor electrode film having a second opposing face opposing the first opposing face and a curved portion protruding, in an initial state where no voltage is applied between the capacitor electrode and the movable capacitor electrode film, toward the capacitor electrode or in an opposite direction of the capacitor electrode;
a dielectric film provided on one of the first opposing face and the second opposing face; and
a conductor pattern buried in the dielectric film so as to be exposed toward the movable capacitor electrode film.

8. The variable capacitor according to any one of claims 1 to 7, further comprising an anchor portion that partially connects between the capacitor electrode and the movable capacitor electrode film.

9. The variable capacitor according to any one of claims 1 to 7, wherein the capacitor electrode is a fixed electrode.

10. The variable capacitor according to any one of claims 1 to 7, wherein the capacitor electrode is a movable capacitor electrode film.

* * * * *